United States Patent
Jiang et al.

(10) Patent No.: US 12,556,041 B2
(45) Date of Patent: Feb. 17, 2026

(54) TRANSMITTER DEVICE, RECEIVER DEVICE, AND WIRELESS CHARGING METHOD

(71) Applicant: Huawei Technologies Co., Ltd., Shenzhen (CN)

(72) Inventors: Weipeng Jiang, Beijing (CN); Tao Huang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 723 days.

(21) Appl. No.: 17/947,406

(22) Filed: Sep. 19, 2022

(65) Prior Publication Data

US 2023/0012020 A1 Jan. 12, 2023

Related U.S. Application Data

(63) Continuation of application No. PCT/CN2020/079814, filed on Mar. 18, 2020.

(51) Int. Cl.
*H02J 50/80* (2016.01)
*H02J 50/20* (2016.01)
*H02J 50/40* (2016.01)

(52) U.S. Cl.
CPC ............. *H02J 50/80* (2016.02); *H02J 50/20* (2016.02); *H02J 50/40* (2016.02)

(58) Field of Classification Search
CPC .. H02J 50/80; H02J 50/20; H02J 50/40; H02J 7/00034; H02J 7/0013; H02J 7/02
See application file for complete search history.

(56) References Cited

U.S. PATENT DOCUMENTS

| | | | |
|---|---|---|---|
| 8,410,953 B2 | 4/2013 | Zeine | |
| 9,673,665 B2* | 6/2017 | Zeine | H02J 50/20 |
| 9,853,458 B1* | 12/2017 | Bell | H02J 50/80 |
| 9,859,756 B2* | 1/2018 | Leabman | H02J 50/80 |
| 9,887,584 B1 | 2/2018 | Bell et al. | |
| 9,899,873 B2* | 2/2018 | Bell | H02J 50/80 |
| 9,899,882 B2* | 2/2018 | Lee | H02J 50/12 |
| 9,900,057 B2* | 2/2018 | Leabman | H02J 50/20 |
| 10,056,946 B2 | 8/2018 | Lee et al. | |

(Continued)

FOREIGN PATENT DOCUMENTS

| | | | | |
|---|---|---|---|---|
| CA | 2816082 A1 * | 5/2012 | | H02J 50/12 |
| CA | 2776019 A1 * | 10/2012 | | H02J 7/00034 |

(Continued)

*Primary Examiner* — Jared Fureman
(74) *Attorney, Agent, or Firm* — Conley Rose, P.C.

(57) ABSTRACT

A transmitter device includes a signaling modulation module, an energy modulation module, and an antenna element. The signaling modulation module is configured to generate a narrowband modulation signal that carries signaling. The signaling includes an indication for a correspondence between a first resource and a receiver device. The first resource is scheduled based on a pre-received charging request signal from the receiver device. The energy modulation module is configured to perform amplitude and phase adjustment on the narrowband modulation signal based on the pre-received charging request signal to form an energy transmission signal. The antenna element is configured to transmit the energy transmission signal on the first resource to charge one or more receiver devices.

20 Claims, 13 Drawing Sheets

(56) References Cited

U.S. PATENT DOCUMENTS

| | | | |
|---|---|---|---|
| 10,063,064 B1* | 8/2018 | Bell | H02J 50/80 |
| 10,090,886 B1* | 10/2018 | Bell | H02J 50/80 |
| 10,212,723 B2* | 2/2019 | Jiang | H04L 5/0005 |
| 10,284,254 B2* | 5/2019 | Matsuo | H02J 7/00034 |
| 10,447,094 B2* | 10/2019 | Ku | H02J 50/23 |
| 10,862,351 B2* | 12/2020 | Park | H02J 50/10 |
| 10,886,787 B2* | 1/2021 | Fukaya | H02J 50/402 |
| 10,951,073 B2* | 3/2021 | Ogawa | H04B 5/79 |
| 11,171,689 B2* | 11/2021 | Taniguchi | H04W 52/243 |
| 11,258,304 B2* | 2/2022 | Avestruz | H02J 50/80 |
| 11,264,841 B2* | 3/2022 | Zeine | H02J 50/70 |
| 11,848,572 B2* | 12/2023 | Kim | H02J 50/12 |
| 2010/0315045 A1 | 12/2010 | Zeine | |
| 2012/0274154 A1* | 11/2012 | DeLuca | H02J 50/40 |
| | | | 307/149 |
| 2015/0303741 A1* | 10/2015 | Malik | H02J 50/001 |
| | | | 307/104 |
| 2016/0013677 A1* | 1/2016 | Bell | H04W 4/80 |
| | | | 307/104 |
| 2019/0131827 A1* | 5/2019 | Johnston | H04B 5/79 |
| 2021/0281125 A1* | 9/2021 | Sato | H02J 50/10 |

FOREIGN PATENT DOCUMENTS

| | | | | |
|---|---|---|---|---|
| CN | 106602746 A | 4/2017 | | |
| CN | 107947389 A | 4/2018 | | |
| CN | 109041586 A | 12/2018 | | |
| WO | WO-2008112977 A1 * | 9/2008 | | G06K 19/0701 |
| WO | 2017117452 A1 | 7/2017 | | |

* cited by examiner stuff# TRANSMITTER DEVICE, RECEIVER DEVICE, AND WIRELESS CHARGING METHOD

CROSS-REFERENCE TO RELATED APPLICATIONS

This is a continuation of International Patent Application No. PCT/CN2020/079814 filed on Mar. 18, 2020, the disclosure of which is hereby incorporated by reference in its entirety.

TECHNICAL FIELD

This application relates to the field of wireless charging, and more specifically, to a transmitter device, a receiver device, and a wireless charging method.

BACKGROUND

Microwaves have been currently used as energy transfer signals in a wireless charging technology. This wireless charging technology may be referred to as microwave charging. Specifically, in microwave charging, amplitude and phase adjustment is performed on electromagnetic waves, and energy is focused at one or more locations based on the principle of interference, so as to implement high-power microwave energy transmission. In some cases, for example, when a transmitter device charges a plurality of receiver devices, the transmitter device needs to establish an energy transmission link with the receiver devices through signaling interaction before charging. For example, because different resources are used for charging signals transmitted by different receiver devices, the transmitter device may notify, by using signaling in advance, the receiver devices of specific resources on which the charging signals are received. For another example, the receiver devices may transmit signals to the transmitter device in advance, so that the transmitter device performs amplitude and phase adjustment for different receiver devices. To distinguish correspondences between different signals and receiver devices, the receiver devices and the transmitter device may need to negotiate, in advance by using signaling, time domains or frequencies for transmitting signals.

However, to obtain high charging efficiency, single-frequency carrier signals are usually used as energy transmission signals. However, single-frequency carrier signals cannot be used to carry signaling. To perform signaling interaction, an additional communications link (for example, a radio-frequency link) is further required. This increases hardware complexity of devices and raises costs.

SUMMARY

This application provides a transmitter device, a receiver device, and a wireless charging method, to reduce hardware complexity of devices and cut costs.

According to a first aspect, a transmitter device is provided, including a signaling modulation module, an energy modulation module, and an antenna element. The signaling modulation module is configured to generate a narrowband modulation signal that carries signaling. The signaling includes an indication for a correspondence between a first resource and one or more receiver devices. The first resource is a time domain resource and/or a frequency domain resource scheduled for transmitting an energy transmission signal based on one or more pre-received charging request signals. The one or more charging request signals come from the one or more receiver devices. The energy modulation module is configured to perform amplitude and phase adjustment on the narrowband modulation signal based on the one or more pre-received charging request signals, to form the energy transmission signal. The antenna element is configured to transmit the energy transmission signal on the first resource, and the energy transmission signal is used to charge the one or more receiver devices.

Based on the foregoing design, the transmitter device can charge the receiver device, and carry the signaling in the energy transmission signal. In this case, an additional communications link is not needed for signaling interaction between the transmitter device and the receiver device. A same link is used for energy transmission and signaling transmission. This implements energy transmission and signaling transmission simultaneously, greatly reduces hardware complexity of a transmitter device, and cuts hardware costs. In addition, the signaling is carried in the energy transmission signal. To be specific, after an energy transmission link is established through the signaling, the energy transmission signal can be immediately received. Therefore, the receiver device can be more timely charged.

With reference to the first aspect, in some implementations of the first aspect, the signaling further includes a correspondence between one or more orthogonal codes and the one or more receiver devices, and each orthogonal code is allocated to a corresponding receiver device to distinguish different receiver devices.

In this way, in a scenario in which the transmitter device charges a plurality of receiver devices, different receiver devices may be distinguished based on different resources and/or different orthogonal codes, and the receiver devices do not affect each other. In other words, a time domain resource, a frequency domain resource, and a code domain resource are fully utilized, to greatly improve a resource multiplexing rate. Therefore, the transmitter device may charge more receiver devices, and helps improve energy utilization of the transmitter device.

With reference to the first aspect, in some implementations of the first aspect, the antenna element is further configured to receive the one or more charging request signals from the one or more receiver devices, and the one or more charging request signals are used to determine an amplitude and a phase of the energy transmission signal.

Therefore, the transmitter device can simultaneously charge the plurality of receiver devices, greatly improving resource utilization. When the plurality of receiver devices need to be charged, this can reduce dependency on a quantity of transmitter devices. In addition, the transmitter device provided in embodiments of this application can transmit the energy and the signaling through a same link, so that hardware complexity and hardware costs are low.

With reference to the first aspect, in some implementations of the first aspect, the one or more receiver devices include a first receiver device. The one or more charging request signals include a first charging request signal from the first receiver device. The first charging request signal carries a charging request, and the charging request includes an identifier of the first receiver device and an indication for a requested resource, so as to request to receive the energy transmission signal on the requested resource. The first receiver device is any one of the one or more receiver devices.

On one hand, the receiver device may carry a device identifier in the charging request signal, so that the transmitter device corresponds a received charging signal to the receiver device. On the other hand, the receiver device may carry the indication for the requested resource in the charging request signal, so that the transmitter device allocates a resource to the receiver device based on the indication.

With reference to the first aspect, in some implementations of the first aspect, the charging request in the first charging request signal is obtained by encoding a first orthogonal code, and the first orthogonal code is an orthogonal code that the first receiver device requests from the transmitter device.

Encoding the charging request by using the orthogonal code can distinguish the first charging request signal from the first receiver device and a charging request signal from another receiver device on the same time-frequency resource. This can greatly improve the resource multiplexing rate.

With reference to the first aspect, in some implementations of the first aspect, the charging request further includes an indication for a charging requirement, to indicate whether the first receiver device has the charging requirement.

To help the transmitter device determine whether a received signal is the charging request signal, the receiver device may indicate, in the charging request, whether there is a charging requirement. In this case, the transmitter device can quickly determine and execute a subsequent corresponding process. For example, when it is determined that there is a charging requirement, the resource is timely allocated to the receiver device for energy transmission. When it is determined that charging termination is required, the resource originally allocated to the receiver device is timely released to transmit the energy transmission signal to another receiver device.

With reference to the first aspect, in some implementations of the first aspect, the charging request further includes a residual capacity of the first receiver device and electricity consumption efficiency of the first receiver device.

In another implementation mode, the receiver device may also send the residual capacity and the electricity consumption efficiency to the transmitter device, so that the transmitter device calculates the standby time of the receiver device and determines whether to charge the receiver device.

Further, the charging request further includes a device type of the first receiver device.

The receiver device may further notify the transmitter device of the device type, so that the transmitter device determines charging priority based on the device type when a plurality of receiver devices need to be charged.

With reference to the first aspect, in some implementations of the first aspect, the charging request further includes synchronization information, and the synchronization information is used for synchronization between a plurality of transmitter devices including the transmitter device.

If the plurality of transmitter devices charge a same receiver device, the receiver device may send the synchronization information to the transmitter devices, so that the transmitter devices perform synchronization between the transmitter devices based on the synchronization information. This helps focus energy at the receiver device, to obtain high charging efficiency.

With reference to the first aspect, in some implementations of the first aspect, the one or more charging request signals are narrowband modulation signals.

A conventional energy transmission signal is a single-frequency carrier signal, and can easily obtain the high charging efficiency, but cannot carry the signaling. In this embodiment of this application, it is experimentally found that the narrowband modulation signal has better charging efficiency than a broadband signal. Compared with a single-frequency carrier signal, the narrowband modulation signal has no significant advantage in charging efficiency. Moreover, the narrowband modulation signal can carry signaling. Therefore, when transmitting the energy transmission signal, the transmitter device may further carry the signaling by using the energy transmission signal, to send information to the receiver device.

With reference to the first aspect, in some implementations of the first aspect, the signaling further includes an indication for an idle resource, and the idle resource is an unscheduled resource.

The transmitter device indicates the idle resource in the signaling, so that each receiver device conveniently learns of a currently available resource. In this case, when there is a charging requirement, the receiver device may request the idle resource from the transmitter device to transmit the energy transmission signal.

With reference to the first aspect, in some implementations of the first aspect, the signaling further includes a device identifier of the transmitter device.

The transmitter device indicates the device identifier in the signaling, so that the receiver device identifies each transmitter device. For example, in a scenario in which the plurality of transmitter devices are charged, the device identifier helps the receiver device determine the synchronization information based on an energy transmission signal corresponding to each transmitter device, to obtain synchronization between the plurality of transmitter devices.

With reference to the first aspect, in some possible implementations of the first aspect, the signaling is a broadcast message.

The transmitter device may transmit the signaling through broadcast. In this way, all receiver devices that can detect the transmitter device can receive the signaling, and the receiver device may know a resource currently allocated to the receiver device for transmitting the energy transmission signal, or may send the charging request based on a current idle resource when there is a charging requirement. The transmitter device may notify each receiver device of such information as the idle resource, a correspondence between an in-use resource and the receiver device, and the like only through the broadcast, and does not need to separately transmit signaling to each receiver device to indicate the resource, greatly reducing signaling overheads.

In an implementation, the transmitter device may periodically send the broadcast message.

The transmitter device can notify each receiver device of the information such as the idle resource, the correspondence between the in-use resource and the receiver device in real time by periodically sending the broadcast message, so that the receiver device can be timely charged.

With reference to the first aspect, in some implementations of the first aspect, the transmitter device further includes a receive/transmit switching module, configured to: switch the antenna element to a transmitting state after the energy modulation module forms the energy transmission signal, and switch the antenna element to a receiving state after the energy transmission signal is transmitted.

In other words, the antenna element of the transmitter device may be configured to receive and transmit a signal. Receiving and transmitting are implemented through a same antenna element at different time points, so that hardware complexity of the device can be greatly reduced, and costs can be cut.

With reference to the first aspect, in some implementations of the first aspect, the energy modulation module is further configured to replicate the narrowband modulation signal into a plurality of narrowband modulation signals, and is configured to perform amplitude and phase adjustment on each narrowband modulation signal in the plurality of narrowband modulation signals based on the one or more pre-received charging request signals, to form a plurality of energy transmission signals. There are a plurality of antenna elements, and the plurality of antenna elements are configured to transmit the plurality of energy transmission signals on the first resource, where energy of the plurality of energy transmission signals overlaps at the one or more receiver devices, to charge the one or more receiver devices.

In other words, the transmitter device may transmit the plurality of energy transmission signals through the plurality of antenna elements, and the energy of the plurality of energy transmission signals may overlap at the one or more receiver devices, so as to implement charging of the one or more receiver devices. When the plurality of receiver devices need to be charged, this can reduce dependency on a quantity of transmitter devices, and greatly improve utilization of the energy transmission signal and utilization of a transmission resource.

According to a second aspect, a first receiver device is provided, including an antenna element, a signal source, and a demodulation module. The signal source is configured to generate a first charging request signal when the first receiver device has a charging requirement, where the first charging request signal is used to request to charge the first receiver device. The antenna element is configured to transmit the first charging request signal, and is configured to receive first signaling from a first transmitter device after transmitting the first charging request signal. The demodulation module is configured to demodulate the first signaling. The first signaling includes an indication for a correspondence between a first resource and one or more receiver devices including the first receiver device. The first resource includes a time domain resource and/or a frequency domain resource scheduled for transmitting an energy transmission signal. The antenna element is further configured to receive, on the first resource, the energy transmission signal from the first transmitter device, where the energy transmission signal is used to charge the one or more receiver devices.

It should be understood that the first receiver device may be any one of the foregoing one or more receiver devices. Simply for ease of differentiation and description, the first receiver device is named the first receiver device, and shall not constitute any limitation on this application.

Based on the foregoing design, the first receiver device may use a same antenna element to receive and transmit a signal. The first receiver device may control the antenna element based on different requirements, so that the antenna element switches between receiving and transmitting. Therefore, a receive link and a transmit link of the first receiver device may share the antenna element, so that a quantity of antenna elements of the first receiver device is reduced, greatly reducing hardware complexity of the receiver device, and cutting hardware costs.

With reference to the second aspect, in some implementations of the second aspect, the first receiver device further includes a receive/transmit control module, configured to switch the antenna element to a transmitting state after the first receiver device generates the first charging request signal, and switch the antenna element to a receiving state after the first receiver device transmits the first charging request signal.

In other words, the receive/transmit control module can control switching of the antenna element between receiving and transmitting.

With reference to the second aspect, in some implementations of the second aspect, the first resource includes a time domain resource, and the device further includes a power splitting module, configured to: increase received power of the first signaling after the first charging request signal is transmitted, and increase received power of the energy transmission signal at a time domain resource location indicated in the first signaling.

With reference to the second aspect, in some implementations of the second aspect, the power splitting module is further configured to allocate no received power at a location other than the time domain resource location indicated in the first signaling.

To be specific, the first receiver device does not necessarily need to be allocated a high received power all the time, but may determine, based on whether a signal is currently received, whether to increase the received power. In this case, power consumption of the receiver device can be reduced. If the first receiver device has a charging requirement, standby time can be prolonged as much as possible.

With reference to the second aspect, in some implementations of the second aspect, the first signaling further includes an indication for a correspondence between the one or more receiver devices and one or more orthogonal codes, and each orthogonal code is allocated to a corresponding receiver device to distinguish different receiver devices.

In this way, in a scenario in which the transmitter device charges a plurality of receiver devices, different receiver devices may be distinguished based on different resources and/or different orthogonal codes, and the receiver devices do not affect each other. In other words, a time domain resource, a frequency domain resource, and a code domain resource are fully utilized, to greatly improve a resource multiplexing rate. Therefore, the transmitter device may charge more receiver devices, and helps improve energy utilization of the transmitter device.

With reference to the second aspect, in some implementations of the second aspect, the first receiver device further includes a signaling modulation module, configured to generate the first charging request signal that carries a first charging request. The first charging request includes a device identifier of the first receiver device and an indication for a requested resource, so as to request to transmit the energy transmission signal on the requested resource.

To be specific, the first receiver device may also modulate signaling in the signal, and carry the device identifier, the requested resource, and the like in the first charging request signal for transmission while transmitting the first charging request signal. This can help the transmitter device determine a correspondence between the receiver device and a charging request signal, and further determine a correspondence between the first receiver device and amplitude and phase adjustment parameter.

With reference to the second aspect, in some implementations of the second aspect, the first charging request is obtained by encoding a first orthogonal code. The first orthogonal code is an orthogonal code that the first receiver device requests from the first transmitter device.

Encoding the charging request by using the orthogonal code can distinguish the first charging request signal of the first receiver device and a charging request signal of another receiver device on the same time-frequency resource. This can greatly improve the resource multiplexing rate.

With reference to the second aspect, in some implementations of the second aspect, the first charging request further includes an indication for a charging requirement, to indicate whether the first receiver device has the charging requirement.

To help the transmitter device determine whether a received signal is the charging request signal, the first receiver device may indicate, in the first charging request, whether there is a charging requirement. In this case, the transmitter device can quickly determine and execute a subsequent corresponding process. For example, when it is determined that there is a charging requirement, the resource is timely allocated to the first receiver device for energy transmission. When it is determined that charging termination is required, the resource originally allocated to the first receiver device is timely released to transmit the energy transmission signal to another receiver device.

With reference to the second aspect, in some implementations of the second aspect, the first charging request further includes a residual capacity of the first receiver device and electricity consumption efficiency of the first receiver device.

In another implementation mode, the first receiver device may also send the residual capacity and the electricity consumption efficiency to the transmitter device, so that the transmitter device calculates the standby time of the receiver device and determines whether to charge the receiver device.

Further, the first charging request further includes a device type of the first receiver device.

The first receiver device may further notify the transmitter device of the device type, so that the transmitter device determines charging priority based on the device type when a plurality of receiver devices need to be charged.

With reference to the second aspect, in some implementations of the second aspect, the first charging request signal is a narrowband modulation signal.

Because signaling is carried in the first charging request signal, the first charging request signal may be modulated into the narrowband modulation signal through narrowband modulation. Therefore, the first charging request signal may be used by the transmitter device to detect an amplitude and a phase, and may simultaneously transmit related information of the receiver device to the transmitter device without using two independent links. This can greatly reduce hardware complexity of the receiver device, and cuts hardware costs.

With reference to the second aspect, in some implementations of the second aspect, the first signaling further includes an indication for an idle resource, and the idle resource is an unscheduled resource.

By indicating the idle resource in the first signaling, the transmitter device allows each receiver device to know a currently available resource. In this case, when there is a charging requirement, the receiver device may request the idle resource from the transmitter device to transmit the energy transmission signal.

With reference to the second aspect, in some implementations of the second aspect, the first signaling further includes an identifier of the first transmitter device.

By indicating the device identifier in the first signaling, the transmitter device allows each receiver device to identify each transmitter device. For example, in a scenario in which the plurality of transmitter devices are charged, the device identifier helps the first receiver device determine the synchronization information based on an energy transmission signal corresponding to each transmitter device, to obtain synchronization between the plurality of transmitter devices.

With reference to the second aspect, in some implementations of the second aspect, the first signaling is a broadcast message.

The transmitter device may send the first signaling through broadcast. In this way, all receiver devices that can detect the transmitter device can receive the first signaling, and each receiver device may know a resource currently allocated to the receiver device for transmitting the energy transmission signal, or may send the charging request based on a current idle resource when there is a charging requirement. The transmitter device may notify each receiver device of such information as the idle resource, a correspondence between an in-use resource and the receiver device, and the like only through the broadcast, and does not need to separately transmit the signaling to each receiver device to indicate the resource, greatly reducing signaling overheads.

With reference to the second aspect, in some implementations of the second aspect, the energy transmission signal is a narrowband modulation signal.

A conventional energy transmission signal is a single-frequency carrier signal, and can easily obtain the high charging efficiency, but cannot carry the signaling. In this embodiment of this application, it is experimentally found that the narrowband modulation signal has better charging efficiency than a broadband signal. Compared with a single-frequency carrier signal, the narrowband modulation signal has no significant advantage in charging efficiency. Moreover, the narrowband modulation signal can carry signaling. Therefore, when transmitting the energy transmission signal, the transmitter device may further carry the signaling by using the energy transmission signal, to send information to the receiver device.

With reference to the second aspect, in some implementations of the second aspect, the antenna element is further configured to receive second signaling from a second transmitter device. The demodulation module is configured to demodulate the second signaling, where the second signaling includes an indication for an idle resource, and the idle resource includes the first resource.

The device further includes a signaling modulation module, configured to generate a second charging request signal that carries a second charging request, where the second charging request includes an indication for the first resource. The antenna element is configured to transmit the second charging request signal.

The first receiver device may further continuously monitor a signal of another transmitter device during charging. When another transmitter device (for example, the second transmitter device) is monitored, the first receiver device may further transmit the second charging request signal to the second transmitter device, to request more transmitter devices to charge the first receiver device, so as to improve charging efficiency.

With reference to the second aspect, in some implementations of the second aspect, the second charging request further includes synchronization information, the synchronization information is used for synchronization between a plurality of transmitter devices, and the plurality of transmitter devices include the first transmitter device and the second transmitter device.

If the plurality of transmitter devices charge the first receiver device, if both the first transmitter device and the second transmitter device are configured to charge the first receiver device, the first receiver device may send the synchronization information to the transmitter devices, so that the transmitter devices perform synchronization between the transmitter devices based on the synchronization information. This helps focus energy at the receiver device, to obtain high charging efficiency.

According to a third aspect, a wireless charging method is provided. The method includes: A transmitter device generates a narrowband modulation signal that carries signaling. The signaling includes an indication for a correspondence between a first resource and one or more receiver devices. The first resource is a time domain resource and/or a frequency domain resource scheduled for transmitting an energy transmission signal based on one or more pre-received charging request signals. The charging request signals come from the receiver devices. The transmitter device performs amplitude and phase adjustment on the narrowband modulation signal based on the one or more pre-received charging request signals, to form the energy transmission signal. The transmitter device transmits the energy transmission signal on the first resource, and the energy transmission signal is used to charge the one or more receiver devices.

With reference to the third aspect, in some implementations of the third aspect, the signaling further includes a correspondence between one or more orthogonal codes and the one or more receiver devices, and each orthogonal code is allocated to a corresponding receiver device to distinguish different receiver devices.

With reference to the third aspect, in some implementations of the third aspect, the method further includes: The transmitter device receives the one or more charging request signals from the one or more receiver devices, and the one or more charging request signals are used to determine an amplitude and a phase of the energy transmission signal.

With reference to the third aspect, in some implementations of the third aspect, the one or more receiver devices include a first receiver device. The one or more charging request signals include a first charging request signal from the first receiver device. The first charging request signal carries a charging request, and the charging request includes an identifier of the first receiver device and an indication for a requested resource, so as to request to receive the energy transmission signal on the requested resource. The first receiver device is any one of the one or more receiver devices.

With reference to the third aspect, in some implementations of the third aspect, the charging request in the first charging request signal is obtained by encoding a first orthogonal code, and the first orthogonal code is an orthogonal code that the first receiver device requests from the transmitter device.

With reference to the third aspect, in some implementations of the third aspect, the charging request further includes an indication for a charging requirement, to indicate whether the first receiver device has the charging requirement.

With reference to the third aspect, in some implementations of the third aspect, the charging request further includes one or more of the following: a residual capacity of the first receiver device and electricity consumption efficiency of the first receiver device.

Further, the charging request further includes a device type of the first receiver device.

With reference to the third aspect, in some implementations of the third aspect, the charging request further includes synchronization information, and the synchronization information is used for synchronization between a plurality of transmitter devices including the transmitter device.

With reference to the third aspect, in some implementations of the third aspect, the charging request signals are narrowband modulation signals.

With reference to the third aspect, in some implementations of the third aspect, that the transmitter device transmits the energy transmission signal on the first resource includes: the transmitter device transmits the energy transmission signal on the first resource via an antenna element. That the transmitter device receives the one or more charging request signals from the one or more receiver devices includes: the transmitter device receives the charging request signals from the one or more receiver devices via the antenna element.

With reference to the third aspect, in some implementations of the third aspect, the method further includes: The transmitter device controls the antenna element to switch to a transmitting state after the energy transmission signal is formed, and controls the antenna element to switch to a receiving state after the energy transmission signal is transmitted.

With reference to the third aspect, in some implementations of the third aspect, the signaling further includes an indication for an idle resource, and the idle resource is an unscheduled resource.

With reference to the third aspect, in some implementations of the third aspect, the signaling further includes a device identifier of the transmitter device.

With reference to the third aspect, in some implementations of the third aspect, the signaling is a broadcast message.

With reference to the third aspect, in some implementations of the third aspect, that the transmitter device performs amplitude and phase adjustment on the narrowband modulation signal based on the pre-received charging request signals, to form the energy transmission signal includes: The transmitter device replicates the narrowband modulation signal into a plurality of narrowband modulation signals, and is configured to perform amplitude and phase adjustment on each narrowband modulation signal in the plurality of narrowband modulation signals based on the one or more pre-received charging request signals, to form a plurality of energy transmission signals. That the transmitter device transmits the energy transmission signal on the first resource, and the energy transmission signal is used to charge the one or more receiver devices includes: The transmitter device transmits the plurality of energy transmission signals on the first resource, where energy of the plurality of energy transmission signals overlaps at the one or more receiver devices, to charge the one or more receiver devices.

Related descriptions of the foregoing implementations are described in detail in the first aspect. For brevity, details are not described herein again.

According to a fourth aspect, a wireless charging method is provided. The method includes: A first receiver device transmits a first charging request signal when the first receiver device has a charging requirement. The first charging request signal is used to request to charge the first receiver device. The first receiver device receives first signaling from a first transmitter device. The first signaling includes an indication for a correspondence between a first resource and one or more receiver devices including the first receiver device. The first resource includes a time domain resource and/or a frequency domain resource scheduled for transmitting an energy transmission signal. The first receiver device receives, on the first resource, the energy transmission signal from the first transmitter device, where the energy transmission signal is used to charge the receiver devices.

More specifically, the first receiver device may receive and transmit a signal via an antenna element. For example, the first receiver device may, via the antenna element, transmit the first charging request signal, receive signaling from the first transmitter device, and receive the energy transmission signal from the first transmitter device.

With reference to the fourth aspect, in some implementations of the fourth aspect, the method further includes: The first receiver device controls the antenna element to switch to a transmitting state when the first receiver device has a charging requirement, and controls the antenna element to switch to a receiving state after the first charging request signal is transmitted.

With reference to the fourth aspect, in some implementations of the fourth aspect, the first resource includes a time domain resource. The method further includes: The first receiver device increases received power of the first signaling after the charging request signal is transmitted, and increases received power of the energy transmission signal at a time domain resource location indicated in the first signaling.

With reference to the fourth aspect, in some implementations of the fourth aspect, the first signaling further includes an indication for a correspondence between the one or more receiver devices and one or more orthogonal codes, and each orthogonal code is allocated to a corresponding receiver device to distinguish different receiver devices.

With reference to the fourth aspect, in some implementations of the fourth aspect, the method further includes: The first receiver device generates the first charging request signal that carries a first charging request. The first charging request includes a device identifier of the first receiver device and an indication for a requested resource, so as to request to transmit the energy transmission signal on the requested resource.

With reference to the fourth aspect, in some implementations of the fourth aspect, the first charging request is obtained by encoding a first orthogonal code. The first orthogonal code is an orthogonal code that the first receiver device requests from the first transmitter device.

With reference to the fourth aspect, in some implementations of the fourth aspect, the first charging request further includes an indication for a charging requirement, to indicate whether the first receiver device has the charging requirement.

With reference to the fourth aspect, in some implementations of the fourth aspect, the first charging request further includes a residual capacity of the first receiver device and electricity consumption efficiency of the first receiver device.

Further, the first charging request further includes a device type of the first receiver device.

With reference to the fourth aspect, in some implementations of the fourth aspect, the first charging request signal is a narrowband modulation signal.

With reference to the fourth aspect, in some implementations of the fourth aspect, the first signaling further includes an indication for an idle resource, and the idle resource is an unscheduled resource.

With reference to the fourth aspect, in some implementations of the fourth aspect, the first signaling further includes an identifier of the first transmitter device.

With reference to the fourth aspect, in some implementations of the fourth aspect, the first signaling is a broadcast message.

With reference to the fourth aspect, in some implementations of the fourth aspect, the energy transmission signal is a narrowband modulation signal.

With reference to the fourth aspect, in some implementations of the fourth aspect, the method further includes: The first receiver device receives second signaling from a second transmitter device. The second signaling includes an indication for an idle resource, and the idle resource includes the first resource. The first receiver device generates a second charging request signal that carries a second charging request. The second charging request includes an indication for the first resource. The first receiver device transmits the second charging request signal.

With reference to the fourth aspect, in some implementations of the fourth aspect, the second charging request further includes synchronization information, the synchronization information is used for synchronization between a plurality of transmitter devices, and the plurality of transmitter devices include the first transmitter device and the second transmitter device.

Related descriptions of the foregoing implementations are described in detail in the second aspect. For brevity, details are not described herein again.

According to a fifth aspect, a wireless charging system is provided. The wireless charging system includes one or more transmitter devices and one or more receiver devices. The transmitter device may be the transmitter device in any possible implementation of the first aspect. The receiver device may be the receiver device in any possible implementation of the second aspect.

According to a sixth aspect, a computer-readable storage medium is provided. The computer-readable medium stores program code to be executed by a device, and the program code is used to perform the method in any possible implementation of the third aspect or the fourth aspect.

According to a seventh aspect, a computer program product is provided. When the computer program product runs on a computer, the computer is enabled to perform the method in any possible implementation of the third aspect or the fourth aspect.

According to an eighth aspect, a chip is provided. The chip includes a processor and an interface. The processor reads, through the interface, instructions stored in a memory, to perform the method in any possible implementation of the third aspect or the fourth aspect.

Optionally, in an implementation, the chip includes the memory. The memory stores the instructions. The processor is configured to execute the instructions stored in the memory. When the instructions are executed, the processor is configured to implement the method in any possible implementation of the third aspect or the fourth aspect.

DESCRIPTION OF EMBODIMENTS

The following describes technical solutions of this application with reference to accompanying drawings.

For ease of understanding embodiments of this application, several terms used in this application are first briefly described.

1. Resource: A resource used to transmit an energy transmission signal (or a transmission resource for an energy transmission signal) in embodiments of this application may include a time domain resource and/or a frequency domain resource. In other words, a same transmitter device may transmit the energy transmission signal to different receiver devices on different time domain resources and/or different frequency domain resources. The energy transmission signal is transmitted to different receiver devices at different time points, or at different frequencies, or at different time points and at different frequencies. The same transmitter device may also transmit the energy transmission signal to different receiver devices on a same time-frequency resource. This is not limited in this application.

2. Narrowband modulation signal: A narrowband modulation signal is a signal whose signal modulation bandwidth is far less than a carrier frequency. In embodiments of this application, for example, a 5.8 GHz carrier is used for energy transmission, and the narrowband modulation signal has a bandwidth in kilohertz (kHz). To be specific, a single-frequency carrier signal generated by a signal source has a bandwidth of 5.8 GHz, and the narrowband modulation signal obtained through modulation has a bandwidth of a kHz magnitude.

Figure 2:
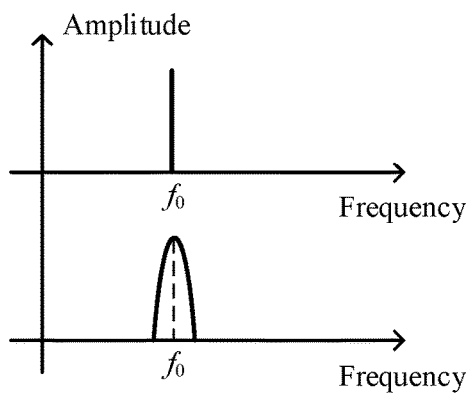
FIG. 2 is a schematic diagram of a single-frequency carrier signal and a narrowband modulation signal according to an embodiment of this application.

Different from the single-frequency carrier signal, the narrowband modulation signal may be understood as superposition of signals of a plurality of frequencies. FIG. 2 shows a difference between a single-frequency carrier signal and a narrowband modulation signal. As shown in FIG. 2, a horizontal axis indicates a frequency, and a vertical axis indicates an amplitude. FIG. 2 shows frequencies of the single frequency carrier signal (see a straight line at a frequency f0 in FIG. 2) and the narrowband modulation signal (see a curve near a frequency f0 in FIG. 2).

3. Uplink and downlink: In embodiments of this application, a transmission link via which a signal is transmitted from a transmitter device to a receiver device may be referred to as downlink. On the other hand, a transmission link via which a signal is transmitted from the receiver device to the transmitter device may be referred to as uplink. The uplink and the downlink are named merely for ease of description and differentiation between different signal flows, and shall not constitute any limitation on this application.

Figure 1:
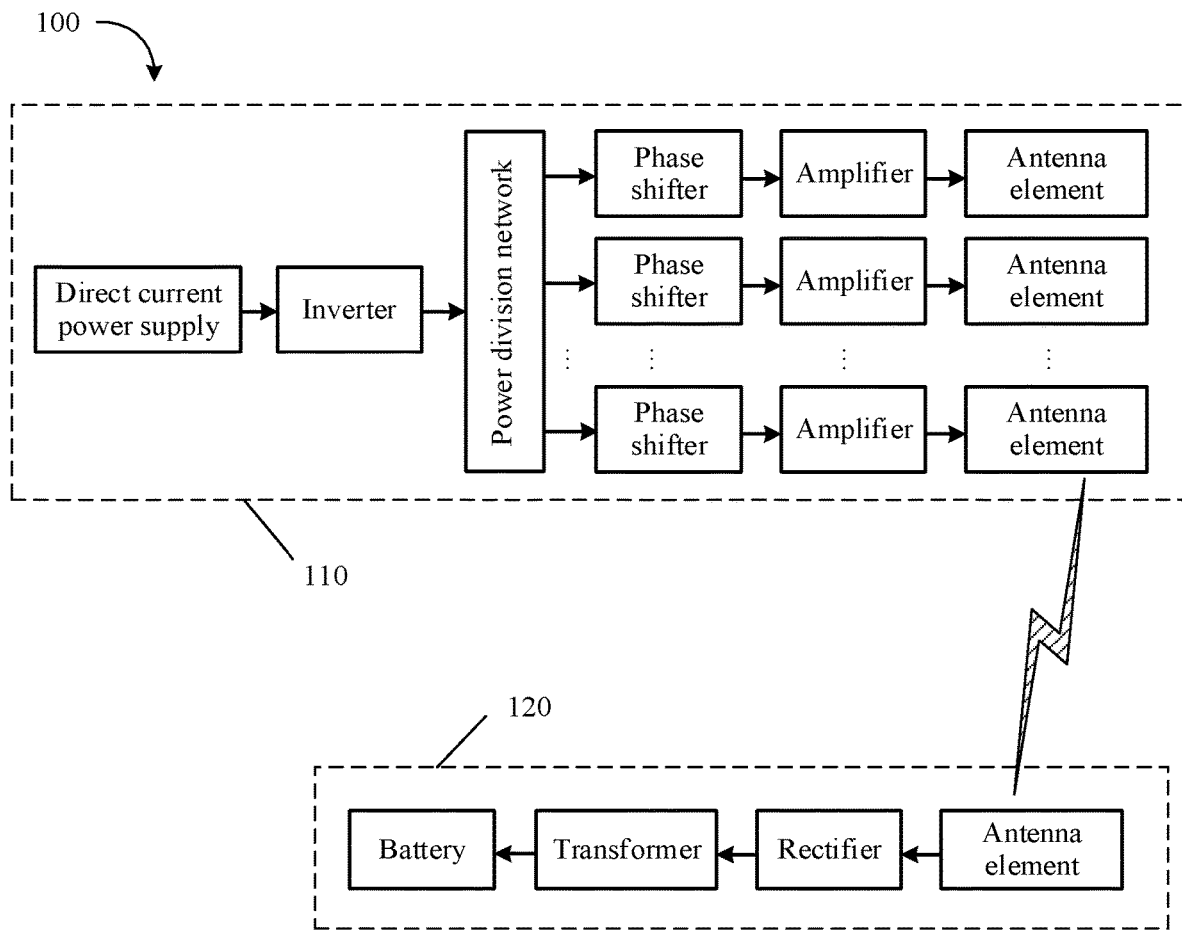
FIG. 1 is a schematic diagram of a charging system applicable to a wireless charging method according to an embodiment of this application.

To facilitate understanding of the method provided in embodiments of this application, a system to which a wireless charging method provided in embodiments of this application is applicable is first briefly described. FIG. 1 shows a charging system 100 including a transmitter device 110 and a receiver device 120. It should be understood that FIG. 1 merely shows an example, and shall not constitute any limitation on this application. The charging system 100 may alternatively include another quantity of transmitter devices and/or another quantity of receiver devices. This is not limited in this application.

The transmitter device 110 may include a direct current power supply, an inverter, a power division network, a phase shifter, a power amplifier, a transmit antenna, and the like. The direct current power supply may be configured to output a direct current signal. The inverter may be configured to convert, to an alternating current signal, a direct current signal that is output by the direct current power supply. Then the power division network may be configured to replicate the one alternating current signal into a plurality of alternating current signals that have a same frequency, a same amplitude, and a same phase. Amplitude adjustment and phase adjustment may be separately performed on the plurality of signals, to form an energy transmission signal. For example, for each signal, the phase adjustment may be performed by using the phase shifter, and power adjustment, also referred to as amplitude adjustment, may be performed by using the power amplifier (amplifier for short). The amplitude adjustment and the phase adjustment may be, for example, referred to as amplitude and phase adjustment for short. A signal obtained through amplitude and phase adjustment may be transmitted through the transmit antenna. Herein, the transmit antenna may include a plurality of antenna elements. Each signal obtained through amplitude and phase adjustment may be transmitted through one antenna element. In other words, signals obtained through different amplitude and phase adjustment may be transmitted through different antenna elements.

In embodiments of this application, for ease of understanding and description, an amplifier connected to each antenna element and a phase shifter connected to the amplifier are referred to as one branch. In other words, one branch may include the amplifier and the phase shifter. Each narrowband modulation signal may go through amplitude and phase adjustment on one branch, and is finally transmitted through an antenna element connected to the branch. For brevity, descriptions of a same or similar case are omitted below.

It may be understood that signals transmitted through a plurality of antenna elements may be electromagnetic wave signals, and phases of the signals transmitted through the plurality of antenna elements may be different from each other. In this way, energy focusing of the electromagnetic wave signal transmitted by each antenna element can be obtained at one or more locations based on the principle of interference, so that the receiver device can be charged. The energy focusing of the signal transmitted by the transmitter device 110 may be formed to charge the receiver device. Therefore, in this embodiment of this application, for ease of differentiation and description, the signal transmitted by the transmitter device 110 is referred to as an energy transmission signal.

It should also be understood that, the transmitter device 110 may also perform amplitude and phase adjustment on only one alternating current signal, to output one energy transmission signal. The energy transmission signal can be used to charge the receiver device. In this case, the transmitter device 110 may alternatively not include the power division network, and includes only the phase shifter, the amplifier, and the antenna element on one branch. This is not limited in this application.

Correspondingly, the receiver device 120 may include a receive antenna, a rectifier, and a transformer. The receive antenna may be configured to receive the energy transmission signal from the transmitter device 110. It may be understood that the signal received by the receive antenna is an alternating current signal. The rectifier may be configured to convert the received alternating current signal into a direct current signal. Then the transformer may be configured to adjust and output a stable voltage, to supply power to a load. For example, in this embodiment of this application, a battery may be charged.

To help the transmitter device 110 determine how to perform amplitude and phase adjustment on an output signal, the receiver device 120 may transmit a signal to the transmitter device 110 in advance, so that the transmitter device 110 determines, based on the signal received from the receiver device, how to perform amplitude and phase adjustment.

For ease of understanding, the following provides descriptions with reference to accompanying drawings. A phase is a main factor that affects whether the energy transmission signal can obtain high-efficiency energy focusing (or energy overlapping) at a place. Therefore, the following describes phase adjustment with reference to the accompanying drawings.

Figure 3:
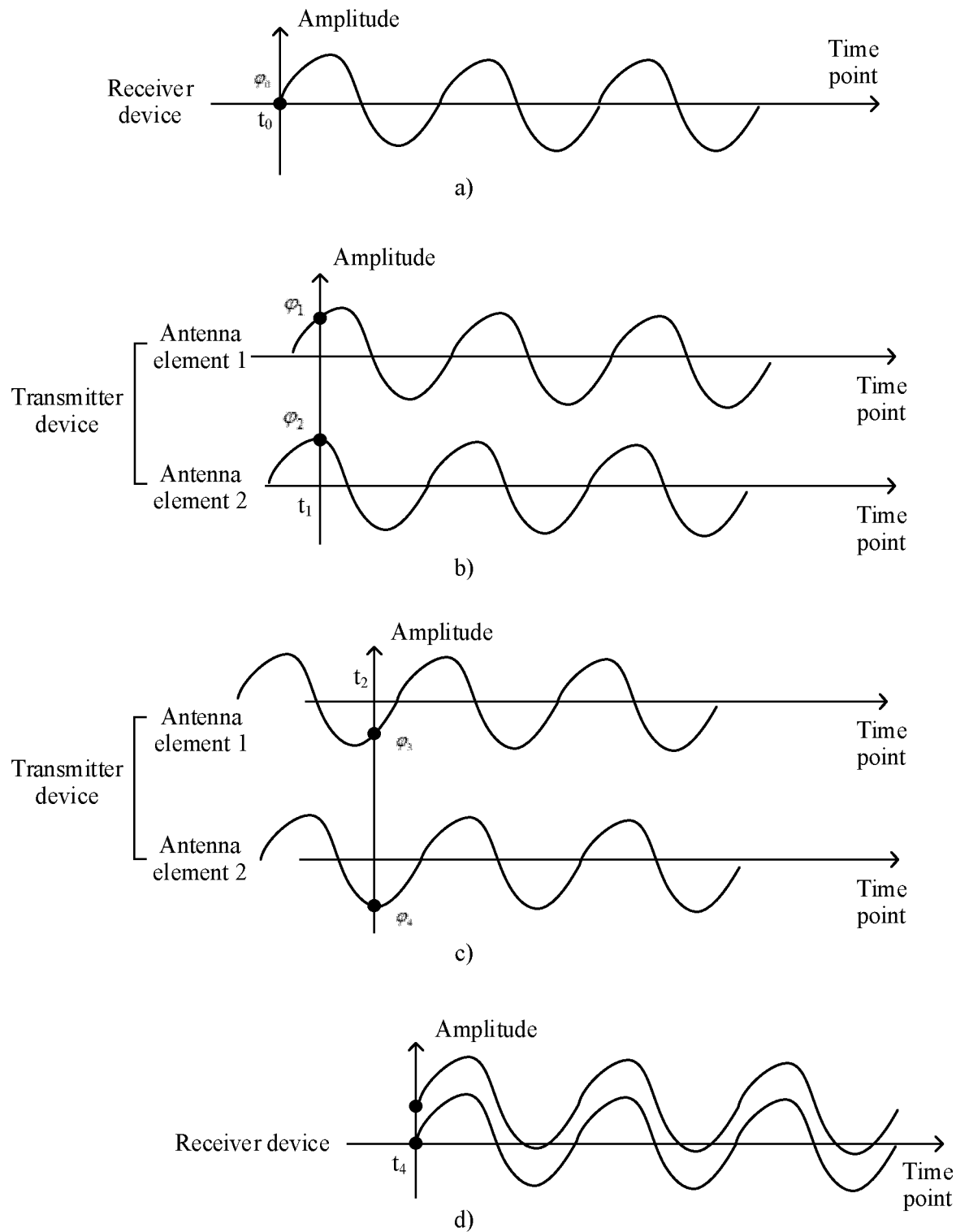
FIG. 3 is a schematic diagram depicting that two antenna elements of a transmitter device perform detection and transmit an energy transmission signal based on a signal of a receiver device according to an embodiment of this application.

FIG. 3 shows a process in which two antenna elements of a transmitter device perform detection and transmit energy transmission signals based on a signal transmitted by a receiver device. a) in FIG. 3 shows a process in which the receiver device transmits the signal. The signal may be, for example, a charging request signal, to request the transmitter device to transmit the energy transmission signal based on detection for the charging request signal. b) in FIG. 3 shows amplitude and phase detection performed on the two antenna elements of the transmitter device based on the same charging request signal. c) in FIG. 3 shows a process in which the transmitter device adjusts, based on detected different phases, phases of the energy transmission signals transmitted via antenna elements. d) in FIG. 3 shows a process in which the receiver device receives the energy transmission signals from the two antenna elements of the transmitter device to obtain energy focusing.

Specifically, a horizontal axis in the figure indicates time, and a vertical axis indicates an amplitude of an electromagnetic wave. In a) in FIG. 3, when the receiver device transmits the signal (for example, denoted as a signal #1), a phase of the receiver device at a sending time point $t_0$ is $\varphi_0$. Because of different transmission paths, phases detected by the transmitter device based on the signal #1 separately via an antenna element 1 and an antenna element 2 at a same time point may be different. As shown in b) in FIG. 3, a phase detected by the transmitter device based on the received signal #1 via the antenna element 1 at a time point $t_1$ is $\varphi_1$. A phase detected by the transmitter device based on the received signal #1 via the antenna element 2 at a time point $t_1$ is $\varphi_2$.

Therefore, the transmitter device may perform different phase adjustment on the energy transmission signals that are to be transmitted through the two different antenna elements. As shown in c) in FIG. 3, a phase of an energy transmission signal transmitted by the antenna element 1 may be adjusted to $\varphi_3$, and a phase of an energy transmission signal transmitted by the antenna element 2 may be adjusted to $\varphi_4$. Phase adjustment performed by the transmitter device on the energy transmission signal is similar to the principle of reversibility of an optical path, so that an energy transmission signal transmitted by each antenna element is similar to a reverse transmission of a charging request signal received by each antenna element. Therefore, $\varphi_3=-\varphi_1$, and $\varphi_4=-\varphi_2$. In this way, energy of the energy transmission signals separately transmitted by the antenna element 1 and the antenna element 2 can be focused at the receiver device. As shown in d) in FIG. 3, the two energy transmission signals form two signals with the same phase at the receiver device. Therefore, interference can be formed, and energy focusing can be obtained.

For example, it is assumed that the charging request signal transmitted by the receiver device is $A_0 \cos(2\pi f_0 t)$. Based on the received charging request signal, a signal detected by the transmitter device at the time point $t_1$ via the antenna element 1 is $A_{T1} \cos(2\pi f_0 t+\varphi_1)$, and a signal detected by the transmitter device at the time point $t_1$ via the antenna element 2 is $A_{T2} \cos(2\pi f_0 t+\varphi_2)$. The energy transmission signal transmitted by the transmitter device via the antenna element 1 is $A_{T1} \cos(2\pi f_0 t-\varphi_1)$, and the energy transmission signal transmitted via the antenna element 2 is $A_{T2} \cos(2\pi f_0 t-\varphi_2)$. The two energy transmission signals interfere with each other at the receiver device, forming the energy focusing.

It should be understood that the foregoing example describes a relationship between an energy transmission signal transmitted by each antenna element of the transmitter device and the received signals transmitted by the receiver device merely for ease of understanding, and shall not constitute any limitation on this application.

It should be further understood that the time point $t_1$ in FIG. 3 may be any time point from receiving the signal #1 to transmitting the energy transmission signal, a time point $t_2$ may be any time point after $t_1$, and a time point $t_3$ may be any time point after $t_2$. Specific values of $t_1$, $t_2$, and $t_3$ are not limited in this application.

It should be further understood that the antenna element 1 may detect different phase values based on the signal #1 at different time points (corresponding to different values of $t_1$), and therefore adjusted phase values may also be different. The antenna element 2 may detect different phase values based on the signal #1 at different time points, and therefore adjusted phase values may also be different. It should be understood that FIG. 3 is merely an example, and shows a process in which two antenna elements separately receive the signal from the same receiver device and perform phase adjustment. However, this shall not constitute any limitation on this application. A quantity of antenna elements of the transmitter device is not limited in this application. In addition, although not shown in FIG. 3, it should be understood that the transmitter device may further perform amplitude adjustment on each signal, for example, perform adjustment based on a preconfigured power ratio, to maximize charging efficiency. This is not limited in this application.

It should be understood that FIG. 1 and FIG. 3 merely show examples, and shall not constitute any limitation on this application. For example, one transmitter device can simultaneously charge a plurality of receiver devices. For another example, a plurality of transmitter devices can simultaneously charge one receiver device. For another example, a plurality of transmitter devices can simultaneously charge a plurality of receiver devices.

When one transmitter device charges a plurality of receiver devices, adjusted amplitude and phase values can be determined by detecting a signal from each receiver device. In this way, amplitude and phase adjustment is performed on each signal, so that signals transmitted by a plurality of antenna elements form energy focusing at the plurality of receiver devices, and the plurality of receiver devices are charged.

When a plurality of transmitter devices simultaneously charge one receiver device, amplitude and phase adjustment may be performed on a signal output by each transmitter device based on a method similar to the foregoing method. However, it may be understood that, because each transmitter device has a different position, and has a different direction and position relative to the same receiver device, each transmitter device performs different amplitude and phase adjustment on the signal.

Figure 4:
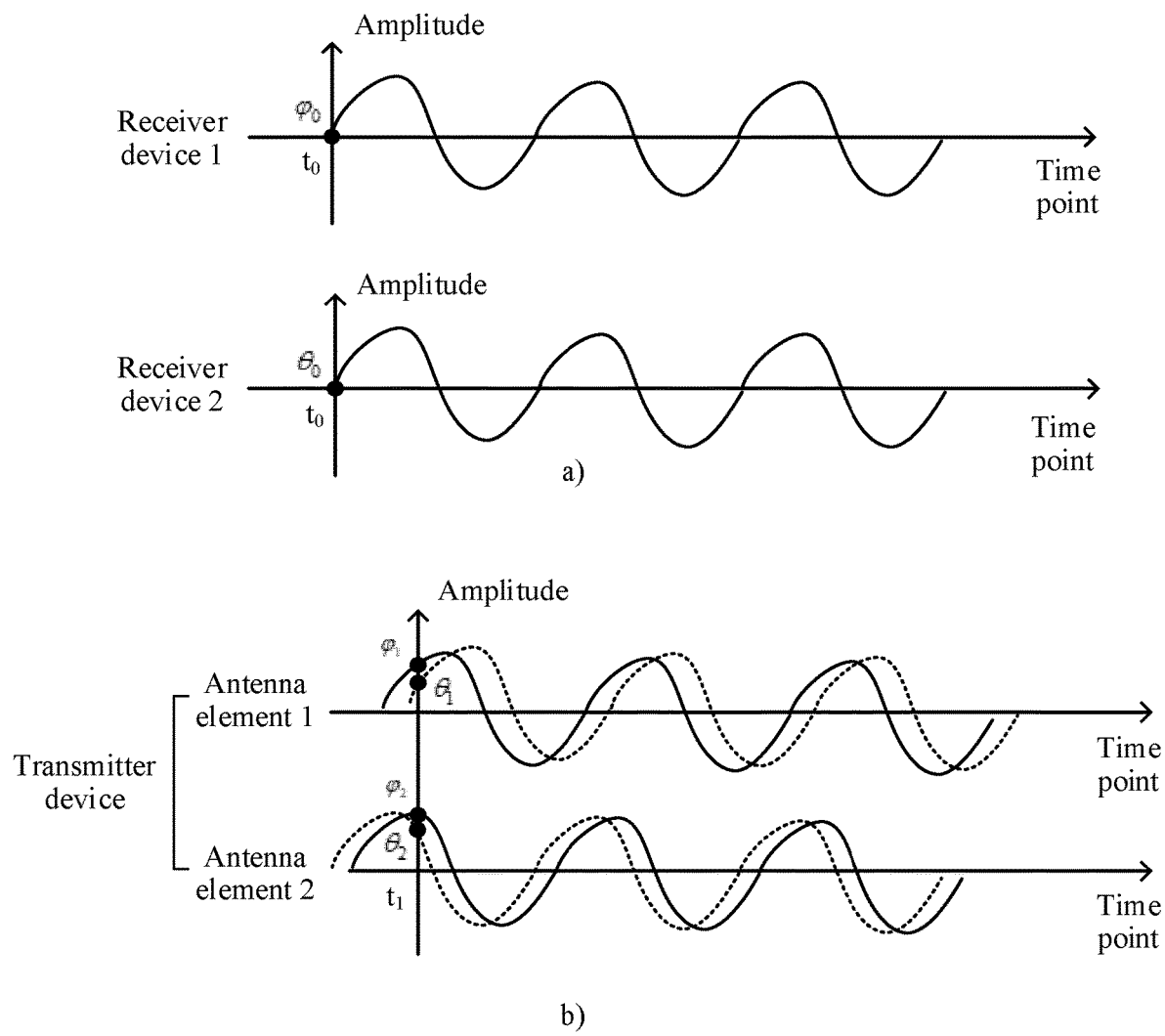
FIG. 4 is a schematic diagram depicting that two antenna elements of a transmitter device perform detection based on signals of two receiver devices according to an embodiment of this application.

FIG. 4 shows phases separately detected by two antenna elements of a transmitter device based on reception of signals transmitted by two receiver devices. a) in FIG. 4 shows charging request signals separately sent by a receiver device 1 and a receiver device 2. b) in FIG. 4 shows amplitude and phase detection performed by an antenna element 1 and an antenna element 2 of the same transmitter device on charging request signals from different receiver devices.

Specifically, a horizontal axis in the figure indicates time, and a vertical axis indicates an amplitude of an electromagnetic wave. The receiver device 1 transmits a signal (for example, a signal #1). The receiver device 2 transmits a signal (for example, denoted as a signal #2).

Because of different transmission paths, phases detected by the transmitter device based on the signal #1 or the signal #2 separately via the antenna element 1 and the antenna element 2 at a same time point may be different, and phases detected by the transmitter device based on the signal #1 and the signal #2 separately via the antenna element 1 and the antenna element 2 at a same time point may be different. However, the transmitter device cannot determine a specific signal from the receiver device 1 and a specific signal from the receiver device 2. Each of the antenna elements (including the antenna element 1 and the antenna element 2) of the transmitter device separately receives two signals: the signal #1 and the signal #2. A phase detected by the antenna element 1 at a time point $t_1$ based on the received signal #1 is $\varphi_1$. A phase detected by the antenna element 2 at the time point $t_1$ based on the received signal #1 is $\varphi_2$. A phase detected by the antenna element 1 at the time point $t_1$ based on the received signal #2 is $\theta_1$, and a phase detected by the antenna element 2 at the time point $t_1$ based on the received signal #2 is $\theta_2$.

For the signal #1, the transmitter device may need to adjust a phase of an energy transmission signal that is to be transmitted via the antenna element 1 to $-\varphi_1$, and adjust a phase of an energy transmission signal that is to be transmitted via the antenna element 2 to $-\varphi_2$. For the signal #2, the transmitter device may need to adjust a phase of an energy transmission signal that is to be transmitted via the antenna element 1 to $-\theta_1$, and adjust a phase of an energy transmission signal that is to be transmitted via the antenna element 2 to $-\theta_2$.

For example, it is assumed that a charging request signal transmitted by the receiver device 1 is $A_{R1} \cos(2\pi f_0 t)$, and a charging request signal transmitted by the receiver device 2 is $A_{R2} \cos(2\pi f_0 t)$. Based on the two charging request signals received by the transmitter device, the signal #1 detected by the antenna element 1 at the time point $t_1$ is $A_{T1R1} \cos(2\pi f_0 t + \varphi_1)$, the signal #1 detected by the antenna element 2 at the time point $t_1$ is $A_{T2R1} \cos(2\pi f_0 t + \varphi_2)$, the signal #2 detected by the antenna element 1 at the time point $t_1$ is $A_{T1R2} \cos(2\pi f_0 t + \theta_1)$, the signal #2 detected by the antenna element 2 at the time point $t_1$ is $A_{T2R2} \cos(2\pi f_0 t + \theta_2)$. The energy transmission signal transmitted by the transmitter device via the antenna element 1 may be determined by $A_{T1R1} \cos(2\pi f_0 t - \varphi_1) + A_{T1R2} \cos(2\pi f_0 t - \theta_1)$, for example, denoted as $A_{T1} \cos(2\pi f_0 t - \beta_{T1})$. The energy transmission signal transmitted by the transmitter device via the antenna element 2 may be determined by $A_{T2R1} \cos(2\pi f_0 t - \varphi_2) + A_{T2R2} \cos(2\pi f_0 t - \theta_2)$, for example, denoted as $A_{T2} \cos(2\pi f_0 t - \beta_{T2})$.

It should be understood that the foregoing example describes a relationship between an energy transmission signal transmitted by each antenna element of the transmitter device and the received signals transmitted by the receiver device merely for ease of understanding, and shall not constitute any limitation on this application.

If the transmitter device cannot identify a specific receiver device that a signal is from, the transmitter device cannot determine how to adjust a phase of an energy transmission signal used to charge the receiver device 1 or the receiver device 2. Based on this, the receiver devices and the transmitter device need to establish an energy transmission link through signaling interaction in advance.

In addition, when transmitting energy transmission signals to different receiver devices, the transmitter device may use different transmission resources. For example, the energy transmission signals are transmitted to different receiver devices at different time points and/or at different frequencies. If each receiver device cannot predetermine a transmission resource for an energy transmission signal used to charge the receiver device, the receiver device may miss receiving the energy transmission signal, and may not be timely charged. Based on this, the receiver devices and the transmitter device also need to establish an energy transmission link through the signaling interaction.

It should be understood that the scenarios listed above are merely for ease of understanding, and signaling interaction between the receiver device and the transmitter device is not limited to the scenarios described above. This is not limited in this application.

With reference to accompanying drawings, the following describes in detail a transmitter device, a receiver device, and a wireless charging method provided in embodiments of this application.

Figure 5:
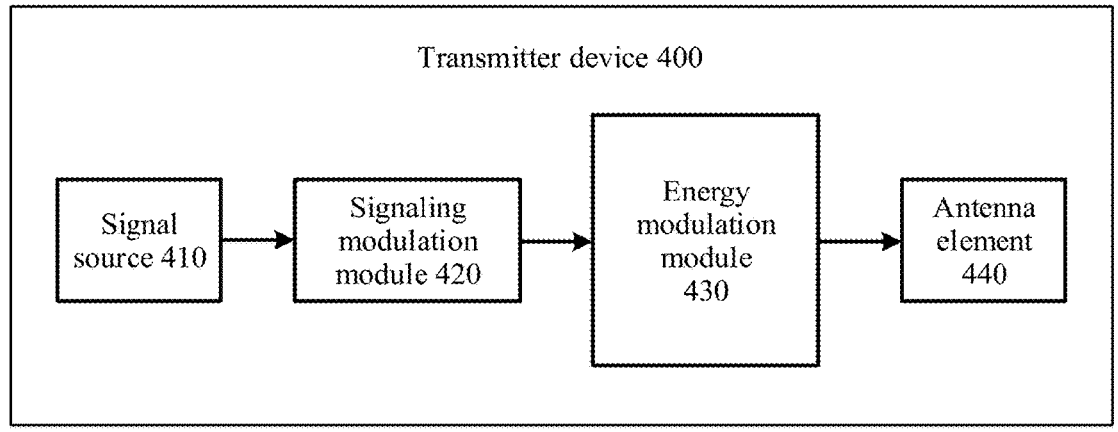
FIG. 5 to FIG. 9 are schematic diagrams of a structure of a transmitter device according to an embodiment of this application.

FIG. 5 is a schematic diagram of a structure of a transmitter device according to an embodiment of this application. As shown in FIG. 5, the transmitter device 400 may include a signal source 410, a signaling modulation module 420, an energy modulation module 430, and an antenna element 440. The signal source 410 is connected to the signaling modulation module 420, and can output a signal to the signaling modulation module 420. The signaling modulation module 420 is connected to the energy modulation module 430, and can output a signal to the energy modulation module 430. The energy modulation module 430 is connected to the antenna element 440, and can output a signal to the antenna element 440. The antenna element 440 can transmit the signal from the energy modulation module 430.

In this embodiment of this application, the signal source 410 may be configured to generate a single-frequency carrier signal. In a possible design, the signal source 410 may include a direct current power supply and an inverter, as shown in FIG. 1. The signal source 410 may be configured to generate a single-frequency carrier signal. The single-frequency carrier signal may be, for example, a high-frequency carrier signal, such as 2.45 GHz or 5.8 GHz. A specific frequency of the carrier signal is not limited in this application.

After receiving the single-frequency carrier signal from the signal source 410, the signaling modulation module 420 may be configured to perform narrowband modulation on the single-frequency carrier signal, and modulate signaling on the carrier signal, to generate a narrowband modulation signal that carries the signaling. For example, the signaling may be generated by the signaling modulation module 420, or generated by another module (not shown in FIG. 5) and then output to the signaling modulation module 420, to perform narrowband modulation. This is not limited in this application.

The energy modulation module 430 may be configured to perform energy modulation on the narrowband modulation signal output by the signaling modulation module. Energy modulation performed on the narrowband modulation signal may specifically include phase adjustment (or a phase shift) and amplitude adjustment (or amplitude modulation). For example, the energy modulation module 430 may adjust a phase by using a phase shifter, and may adjust an amplitude by using an amplifier, to obtain an energy transmission signal. The energy transmission signal is output to the antenna element, and is transmitted by the antenna element. The energy transmission signal can charge a receiver device.

It is experimentally found that a narrowband modulation signal has better charging efficiency than a broadband signal. Compared with a conventional single-frequency signal used for charging, there is no significant charging efficiency gap between the single-frequency signal and the narrowband modulation signal. However, the single-frequency signal cannot carry signaling, and the narrowband modulation signal can carry the signaling. Therefore, when transmitting the energy transmission signal, the transmitter device may further carry signaling by using the energy transmission signal, to send information to the receiver device.

Based on the foregoing design, the transmitter device can charge the receiver device, and carry the signaling in the energy transmission signal. In this case, an additional communications link is not needed for signaling interaction between the transmitter device and the receiver device. A same link is used for energy transmission and signaling transmission. This implements energy transmission and signaling transmission simultaneously, greatly reduces hardware complexity of a transmitter device end, and cuts hardware costs. In addition, the signaling is carried in the energy transmission signal. To be specific, after an energy transmission link is established through the signaling, the energy transmission signal can be immediately received. Therefore, the receiver device can be more timely charged.

To better understand embodiments of this application, the following describes the transmitter device in more detail with reference to more accompanying drawings.

It should be understood that, for brevity, in a plurality of accompanying drawings shown below, modules that are the same as those in FIG. 5 are not repeatedly described. However, the foregoing related descriptions of these modules with reference to FIG. 5 may be applicable to the following accompanying drawings.

Optionally, the energy modulation module 430 may include a plurality of phase shifters and a plurality of amplifiers. The plurality of phase shifters and the plurality of amplifiers may form a plurality of branches. Each branch may be separately configured to perform amplitude and phase adjustment on a signal. Narrowband modulation signals input to the plurality of branches may be generated by the power division network. Correspondingly, there may be a plurality of antenna elements 440. The plurality of antenna elements may be connected to the plurality of branches, to receive and transmit energy transmission signals from the plurality of branches.

Figure 6:
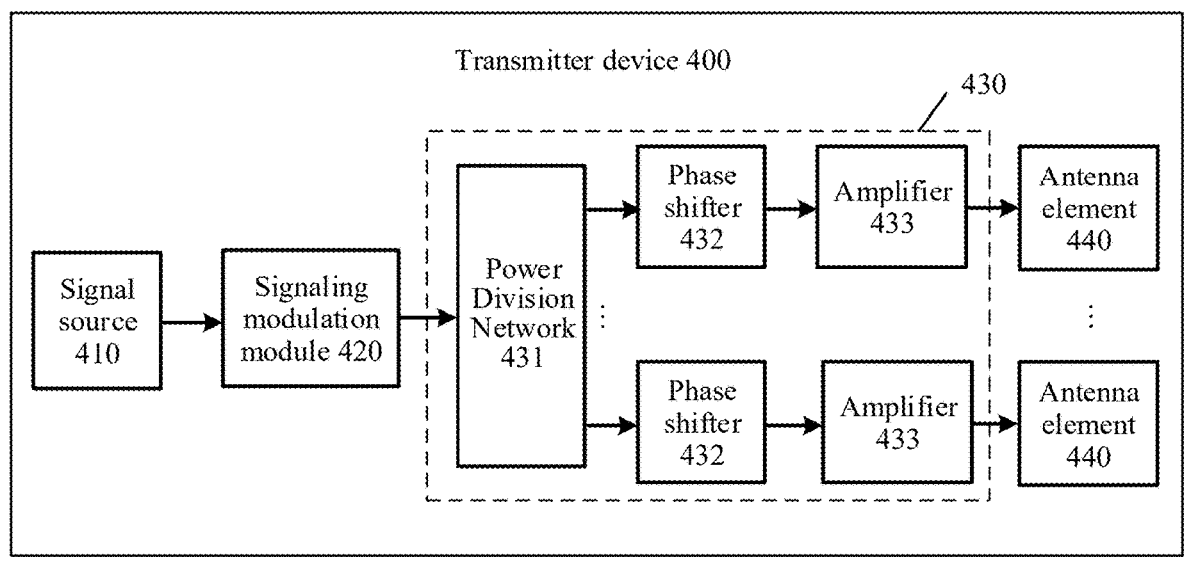

FIG. 6 is another schematic diagram of the transmitter device 400 according to an embodiment of this application. The energy modulation module 430 in the transmitter device 400 shown in FIG. 6 includes a power division network 431 and a plurality of branches connected to the power division network 431. Each branch may include a phase shifter 432 and an amplifier 433. Each branch may be connected to one antenna element 440, to output an energy transmission signal obtained through amplitude and phase adjustment to the antenna element 440. In other words, the transmitter device 400 shown in FIG. 6 includes a plurality of antenna elements 440.

For example, the power division network 431 may replicate a narrowband modulation signal into a plurality of narrowband modulation signals that have a same frequency, a same amplitude, and a same phase. The plurality of narrowband modulation signals that have the same frequency, the same amplitude, and the same phase may be output to different branches. Each signal may form an energy transmission signal through phase adjustment of the phase shifter 432 and/or amplitude adjustment of the amplifier 433. Each energy transmission signal may be output to a connected antenna element 440, and is transmitted by the antenna element 440. Therefore, energy transmission signals transmitted by the plurality of antenna elements 440 may be used to obtain an energy focusing at one or more receiver devices and charge the one or more receiver devices. Functions of the power division network, the phase shifter, and the amplifier are described above with reference to FIG. 1. For brevity, details are not described herein again.

Based on the foregoing design, the transmitter device can simultaneously charge a plurality of receiver devices, greatly improving resource utilization. When the plurality of receiver devices need to be charged, this can reduce dependency on a quantity of transmitter devices. In addition, the transmitter device provided in embodiments of this application can transmit energy and signaling through a same link, so that hardware complexity and hardware costs are low.

It should be noted that, in the transmitter device 400, if the energy transmission signal does not need to carry signaling during a transmission, a signaling modulation module 420 may perform no narrowband modulation on a single-frequency carrier signal from the signal source 410, but directly transmit the single-frequency carrier signal to the energy modulation module 430 for energy modulation, to obtain a plurality of energy transmission carriers. Alternatively, the signaling modulation module 420 may perform narrowband modulation on a single-frequency carrier signal from the signal source 410, but a formed narrowband modulation signal does not carry signaling. The narrowband modulation signal formed through narrowband modulation may be transmitted to the energy modulation module 430 for energy modulation, to obtain a plurality of energy transmission carriers.

Correspondingly, in the transmitter device 400, if the receiver device does not need to be charged in a signaling transmission, the signaling modulation module 420 may perform narrowband modulation on a single-frequency carrier signal from the signal source 410, modulate signaling on the narrowband modulation signal, and then transmit the signaling to the energy modulation module 430. The energy modulation module 430 may perform no amplitude and phase adjustment on the narrowband modulation signal. For example, the energy modulation module 430 may replicate the narrowband modulation signal into a plurality of narrowband modulation signals, and then directly transmit the narrowband modulation signals via a plurality of corresponding antenna elements. Alternatively, the energy modulation module 430 may directly transmit the narrowband modulation signal via any one of the plurality of antenna elements. This is not limited in this application.

It should be noted that no energy modulation may specifically mean that the energy modulation module 430 does not perform amplitude and phase adjustment on the narrowband modulation signal from the signaling modulation module 420, for example, does not perform processing such as phase shifting or amplitude modulation, but directly outputs the narrowband modulation signal to the antenna element 440. In other words, no energy modulation does not mean that the narrowband modulation signal is not input to the energy modulation module 430. For the energy modulation module 430, whether to perform energy modulation on an input narrowband modulation signal may be distinguished through different parameters. For example, if no energy modulation is performed, a phase shift is 0, and an amplitude modulation degree is 1. If energy modulation is performed, a phase shift is not 0, and/or an amplitude modulation degree is not 1. It should be understood that an example of a possible implementation of energy modulation is provided herein merely for ease of understanding, and shall not constitute any limitation on this application.

Similarly, no narrowband modulation may specifically mean that the signaling modulation module 420 does not perform narrowband modulation on the single-frequency carrier signal from the signal source 410, but directly outputs the single-frequency carrier signal to the energy modulation module 430. In other words, no narrowband modulation does not mean that the single-frequency carrier signal is not input to the signaling modulation module 420. For the signaling modulation module 420, whether to perform narrowband modulation on an input single-frequency carrier signal may be distinguished through different parameters. For example, if narrowband modulation is performed, the input single-frequency carrier signal may be multiplied by a complex number. If no narrowband modulation is performed, the input single-frequency carrier signal may be multiplied by 1. It should be understood that an example of a possible implementation of narrowband modulation is provided herein merely for ease of understanding, and shall not constitute any limitation on this application.

In other words, although the transmitter device shown in FIG. 5 includes the signaling modulation module and the energy modulation module, this does not mean that narrowband modulation and energy modulation need to be performed on a signal during each signal transmission. The transmitter device can perform a corresponding operation based on a requirement of the receiver device. However, it may be understood that the transmitter device provided in this application can implement the foregoing functions regardless of whether only narrowband modulation is performed, only energy modulation is performed, or both narrowband modulation and energy modulation are performed.

Figure 7:
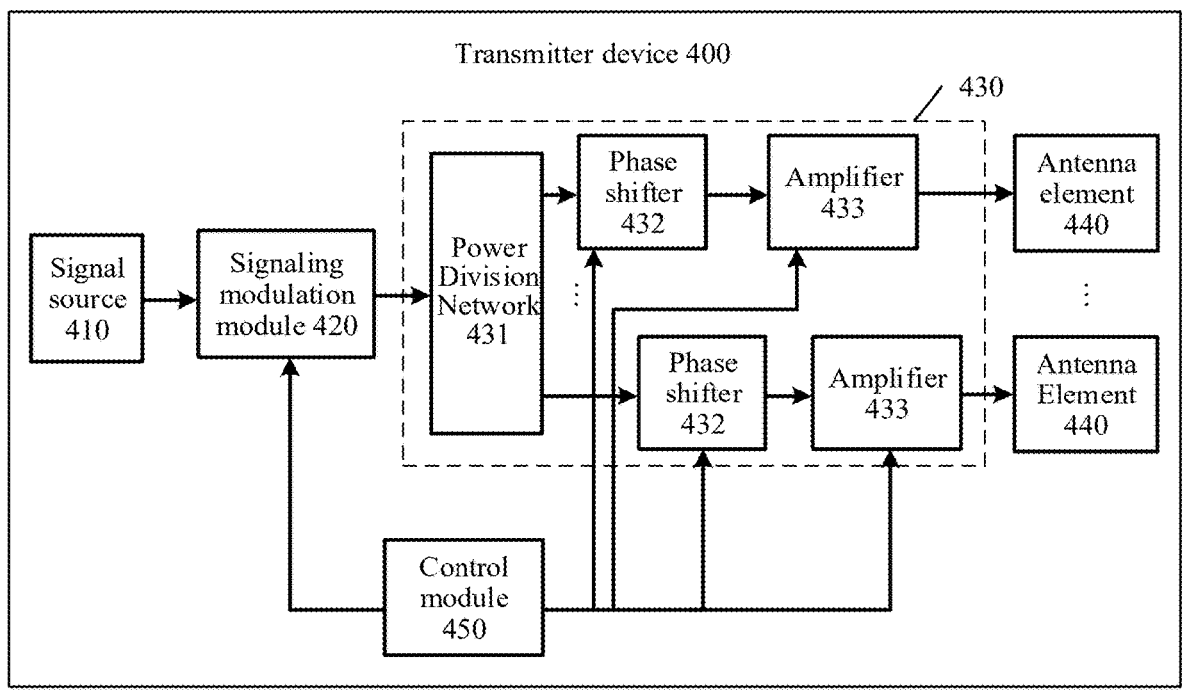

In a possible implementation, the transmitter device may include a control module (the control module 450 shown in FIG. 7). The control module may be configured to control, based on a requirement of each signal transmission, the signaling modulation module 420 and the energy modulation module 430 to perform a corresponding operation.

FIG. 7 is another schematic diagram of a structure of a transmitter device 400 according to an embodiment of this application. As shown in FIG. 7, the transmitter device 400 may further include the control module 450. As described above, the control module 450 may be configured to control the signaling modulation module 420 and the energy modulation module 430.

It should be understood that the control module 450 in FIG. 7 merely shows an example, and shall not constitute any limitation on this application. The control module 450 may be, for example, an independent module, or a plurality of discrete modules. A specific form of the control module 450 is not limited in this application. For example, as shown in FIG. 7, the control module 450 is an independent module, and may control, by separately sending a control command to the signaling modulation module 420 and the energy modulation module 430, the signaling modulation module 420 and the energy modulation module 430 to perform corresponding operations.

For example, if an antenna element of the transmitter device detects a charging request signal from a receiver device, it is considered that the receiver device may need to be charged. The control module 450 may first control the signaling modulation module 420 to generate a narrowband modulation signal that carries signaling. The signaling may be, for example, used to indicate a transmission resource for an energy transmission signal. If the signal transmitted this time is not used for charging, for example, no energy is transmitted during this transmission, no energy modulation needs to be performed. The control module 450 may control the energy modulation module 430 not to perform amplitude and phase adjustment on a received narrowband modulation signal. In other words, the control module 450 may transmit, via the antenna element, the narrowband modulation signal on which no amplitude and phase adjustment is performed.

Then the transmitter device may transmit the energy transmission signal on the previously indicated resource, and charge the receiver device. The energy transmission signal does not carry signaling during the transmission. The control module 450 may control the signaling modulation module 420 not to perform narrowband modulation, or to perform narrowband modulation but without signaling. The control module 450 may further control the energy modulation module 430 to perform amplitude and phase adjustment on a received signal, to form the energy transmission signal, and finally transmit the energy transmission signal via the antenna element. For another example, when charging a receiver device (for example, denoted as a receiver device #1), if the transmitter device detects a signal of another receiver device (for example, denoted as a receiver device #2), signaling may be carried in an energy transmission signal that is transmitted by the transmitter device to the receiver device #1, to notify the receiver device #1 of a transmission resource for an energy transmission signal for the receiver device #2. In this case, the control module 450 may control the signaling modulation module 420 to perform narrowband modulation, to generate a narrowband modulation signal that carries the signaling. The signaling may be used to indicate the transmission resource for the energy transmission signal transmitted to the receiver device #2.

It should be understood that the examples are shown merely for ease of understanding, and shall not constitute any limitation on this application.

In addition to controlling the energy modulation module 430 to perform energy modulation, the control module 450 may also be configured to control a phase shifter 432 in the energy modulation module 430, to control different phase adjustment on narrowband modulation signals on different branches. The control module 450 may indicate a phase adjustment value of a narrowband modulation signal on each branch through a connection channel of a phase shifter 432 on each branch. The control module 450 may also be configured to control an amplifier 433 in the energy modulation module 430, to control different amplitude adjustment on narrowband modulation signals on different branches. The control module 450 may indicate an amplitude adjustment value of the narrowband modulation signal on each branch through a connection channel of an amplifier on each branch. The control module 450 may adjust an amplitude based on, for example, a maximum power, or a preconfigured ratio, to maximize charging efficiency.

In some possible scenarios, a charging position of each receiver device may be fixed. The transmitter device may pre-store an amplitude adjustment value and a phase adjustment value of a signal of each branch corresponding to each charging position. When receiving a signal from a receiver device at a position, the transmitter device may perform amplitude and phase adjustment based on the amplitude adjustment value and the phase adjustment value corresponding to the charging position of the receiver device.

In some other possible scenarios, the receiver device is movable, for example, is a terminal device. The transmitter device may detect an amplitude and a phase based on the signal received from the receiver device, to determine how to perform amplitude and phase adjustment.

Figure 8:
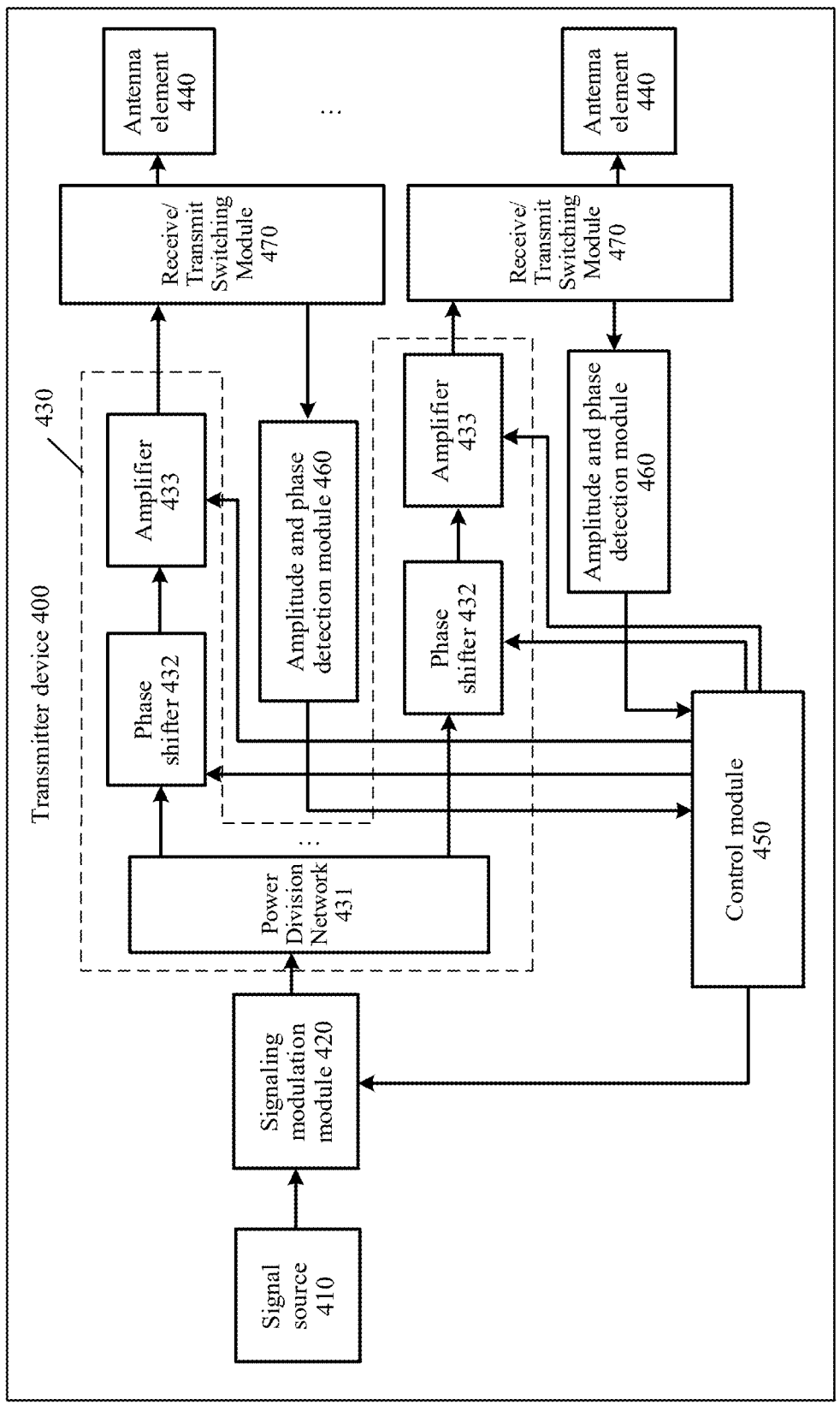

FIG. 8 is another schematic diagram of a structure of a transmitter device according to an embodiment of this application. As shown in FIG. 8, the transmitter device 400 may further include an amplitude and phase detection module 460, configured to detect an amplitude and a phase of a signal from a receiver device. In a possible design, the amplitude and phase detection module 460 may be a module connected between each antenna element 440 and a control module 450. Each antenna element 440 may be connected to one amplitude and phase detection module 460. A plurality of amplitude and phase detection modules 460 may be connected to the control module 450. After receiving a charging request signal from the receiver device, each antenna element 440 may output the charging request signal to the connected amplitude and phase detection module 460, to detect an amplitude and a phase of the received charging request signal. Then detected amplitude and phase are output to the control module 450. Therefore, the control module 450 may determine an amplitude adjustment value and a phase adjustment value of a narrowband modulation signal on each branch.

Because the antenna element may be configured to receive and transmit a signal, in this embodiment, to distinguish different signals, a receive/transmit switching module 470 may be added between the antenna element 440 and the amplifier 433 and the amplitude and phase detection module 460 that are connected to the antenna element 440, to direct signals into different modules. For example, when the energy modulation module 430 outputs a signal, or when a signal needs to be transmitted via the antenna element 440, the receive/transmit switching module 470 may be configured to connect the amplifier 433 and the antenna element 440. In other words, the receive/transmit switching module 470 may be configured to switch the antenna element 440 to a transmitting state. When the antenna element 440 completes a transmission of the signal, or when there is no need to transmit a signal, the receive/transmit switching module 470 may be configured to connect the amplitude and phase detection module 460 and the antenna element 440, or may be configured to switch the antenna element 440 to a receiving state. In this state, the antenna element 440 may be configured to receive the charging request signal from the receiver device.

In some cases, the transmitter device may simultaneously receive charging request signals from a plurality of receiver devices. To distinguish the charging request signals of different receiver devices, each receiver device may carry signaling in the transmitted charging request signal, so that the transmitter device can distinguish the charging request signals of the receiver devices. In this case, the transmitter device may further include a demodulation module (the demodulation module 480 shown in FIG. 9), configured to demodulate received signaling.

Figure 9:
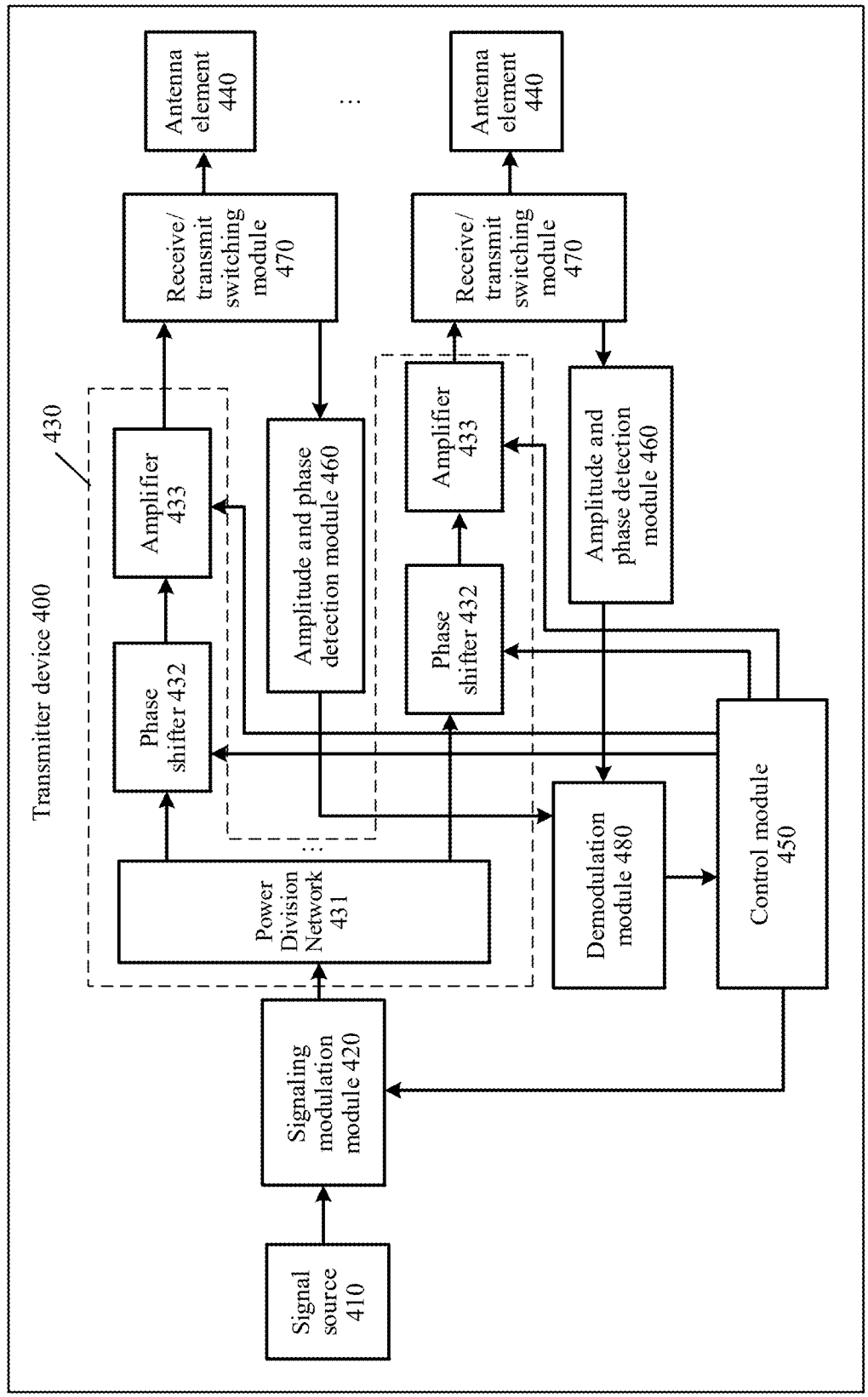

It should be understood that, in FIG. 8 and the following FIG. 9, there may be a plurality of receive/transmit switching modules 470. The plurality of receive/transmit switching modules 470 may be separately connected to a plurality of antenna elements 440, to control switching of each connected antenna element 440 between receiving and transmitting. Alternatively, there may be one receive/transmit switching module 470 connected to a plurality of antenna elements 440, to simultaneously control switching of the plurality of antenna elements 440 between receiving and transmitting. Although not shown in the figure, this is not limited in this application.

It should be further understood that the control module 450 and the receive/transmit switching module 470 shown in FIG. 8 and the following FIG. 9 are defined based on different functions. Essentially, the control module 450 and the receive/transmit switching module 470 each have a control function. Therefore, the control module 450 and the receive/transmit switching module 470 may be a plurality of discrete modules, or may be integrated together. Although not shown in the figure, this is not limited in this application.

FIG. 9 is another schematic diagram of a structure of a transmitter device according to an embodiment of this application. As shown in FIG. 9, the transmitter device 400 may further include a demodulation module 480. The demodulation module 480 may be connected between each amplitude and phase detection module 460 and the control module 450, to demodulate signaling carried in a signal from the amplitude and phase detection module 460. After demodulating the signaling, the demodulation module 480 may further output the signaling to the control module 450, so that the control module 450 determines each receiver device and an amplitude adjustment value and a phase adjustment value corresponding to the receiver device.

In an example, the transmitter device may receive a charging request signal from the receiver device via the antenna element 440. The charging request signal may be used to request the transmitter device to charge the receiver device. The charging request signal may carry signaling. To distinguish from the signaling described above, the signaling carried in the charging request signal is denoted as a charging request. Optionally, the charging request further includes a device identifier of the receiver device. In a possible implementation, the charging request signal from the receiver device is a narrowband modulation signal that carries the charging request. After receiving the charging request signal, the transmitter device may detect an amplitude and a phase of the signal by using the amplitude and phase detection module 460, and output a detection result to the control module 450. Then the amplitude and phase detection module 460 may output the signal to the demodulation module 480, to demodulate the device identifier of the receiver device from the signal. The control module 450 may determine, based on the device identifier of the receiver device from the demodulation module and the detection result from the amplitude and phase detection module 460, an amplitude adjustment value and a phase adjustment value for charging the receiver device. The control module 450 may establish a correspondence between the receiver device and the amplitude adjustment value and the phase adjustment value.

Then the control module 450 may control the signaling modulation module 420 to generate a narrowband modulation signal that carries signaling. The signaling may be used to indicate a transmission resource for an energy transmission signal transmitted by the receiver device. In an implementation, the signaling may include an indication for a correspondence between one or more in-use resources and one or more receiver devices. The transmitter device may perform, by using the energy modulation module 430, energy modulation on the narrowband modulation signal that carries the signaling, to form the energy transmission signal, and transmit the energy transmission signal via the antenna element 440. Alternatively, the transmitter device may perform no energy modulation on the narrowband modulation signal that carries signaling and that is transmitted this time, but perform energy modulation on a narrowband modulation signal generated next time, to form the energy transmission signal, and transmit the energy transmission signal via the antenna element 440. This is not limited in this application.

Signaling carried in the energy transmission signal transmitted by the transmitter device may be used to indicate a correspondence between an in-use resource and a receiver device. The in-use resource is a scheduled resource. In this embodiment of this application, the in-use resource is a resource scheduled for transmitting the energy transmission signal.

For example, the in-use resource includes a first resource, and the receiver device includes a first receiver device. In this case, the correspondence between the in-use resource and the receiver device indicated by the signaling includes a correspondence between the first resource and the first receiver device. The correspondence may be used to indicate the first receiver device to receive the energy transmission signal on the first resource. In other words, the energy transmission signal received by the first receiver device on the first resource may be used to charge the first receiver device.

As described above, energy focusing of the energy transmission signal may be obtained at one or more receiver devices, to charge the one or more receiver devices. Therefore, a correspondence may exist between the first resource and the one or more receiver devices including the first receiver device.

In addition, the signaling further includes an indication for an idle resource. The idle resource is an unscheduled resource. In this embodiment of this application, the idle resource is a resource that is not scheduled for transmitting the energy transmission signal.

It should be understood that the transmitter device indicates the in-use resource and the idle resource based on a currently scheduled resource. At different time points, both the in-use resource and the idle resource may change. In a possible implementation, the transmitter device may periodically transmit signaling to indicate a scheduled resource and an unscheduled resource in a current period. The period may be understood as a period in which the transmitter device transmits signaling to notify an in-use resource and an idle resource. For example, for a period 1, an in-use resource indicated by signaling transmitted by the transmitter device in the period 1 may be considered as that the in-use resource is scheduled and used in the period 1. An idle resource indicated by signaling transmitted by the transmitter device in the period 1 may be considered as that the idle resource is not scheduled nor used in the period 1.

Optionally, the signaling is a broadcast message. In other words, all receiver devices that can detect the transmitter device can receive the broadcast message. Therefore, based on the received signaling, the receiver devices may determine a specific resource that is scheduled, and a specific resource that is not scheduled. Therefore, a receiver device having a charging requirement may request a resource from the transmitter device based on latest received signaling, so as to receive the energy transmission signal on the requested resource.

In a possible design, the broadcast message may be used to indicate an idle resource and a correspondence between one or more in-use resources and one or more receiver devices.

Still further, the transmitter device periodically sends the broadcast message. In other words, the transmitter device periodically generates a broadcast message to indicate an idle resource and a correspondence between in-use resources and receiver devices.

In the following method embodiments, a process of transmitting the signaling and the energy transmission signal by the transmitter device is described with reference to a specific process. Details are not described herein.

In some possible scenarios, the transmitter device may receive signals from different receiver devices on a same resource (for example, at a same frequency and a same time point). To distinguish different receiver devices, the transmitter device may further provide an orthogonal code to the receiver device for use.

Herein, the orthogonal code may be specifically used to encode a signal, so that an encoded signal can be decoded based on the same orthogonal code. In addition, if encoding is performed based on different orthogonal codes, obtained signals may be orthogonal to each other when the signals are transmitted on a same time-frequency resource. In other words, when a plurality of receiver devices transmit encoded signals on the same time-frequency resource, the receiver devices are transparent to each other because of different orthogonal codes.

Optionally, the broadcast message further indicates an idle orthogonal code and/or a correspondence between an in-use orthogonal code and a receiver device. Herein, the idle orthogonal code may be understood as an orthogonal code that is not allocated to the receiver device for use, and the in-use orthogonal code may be understood as an orthogonal code that has been allocated to the receiver device for use.

When requesting the transmitter device to use an orthogonal code, the receiver device may select one of the idle orthogonal codes, encode the signal by using the requested orthogonal code, and transmit an encoded signal to the transmitter device. If determining that the orthogonal code is not allocated to another receiver device for use, the transmitter device may allocate the orthogonal code to the receiver device for use. In an implementation, the transmitter device may notify the receiver device of a correspondence between the orthogonal code and the receiver device by using the broadcast message. Therefore, the receiver device may determine that the orthogonal code is allocated to the receiver device for use.

Based on the foregoing solution, in a scenario in which the transmitter device charges a plurality of receiver devices, different receiver devices may be distinguished based on different resources and/or different orthogonal codes, and the receiver devices do not affect each other. In other words, a time domain resource, a frequency domain resource, and a code domain resource are fully utilized, to greatly improve a resource multiplexing rate. Therefore, the transmitter device may charge more receiver devices, and helps improve energy utilization of the transmitter device.

It should be understood that the plurality of accompanying drawings mentioned above merely exemplarily show two branches and two antenna elements, but this shall not constitute any limitation on this application. A quantity of branches and a quantity of antenna elements of the transmitter device are not limited in this application. For ease of understanding, an ellipsis is used in the figure.

Figure 10:
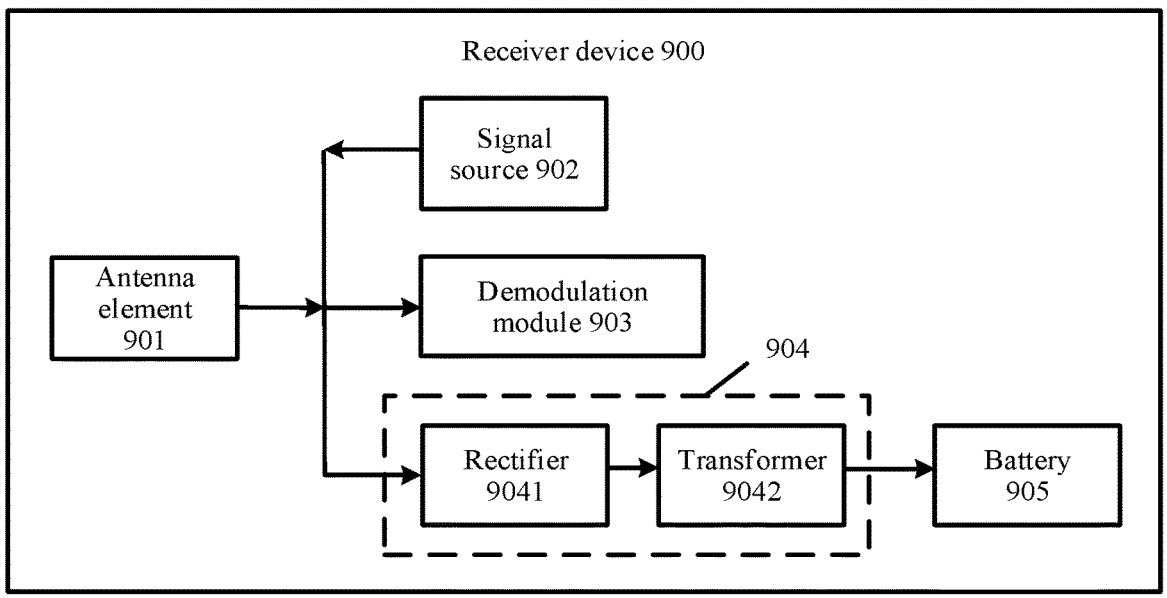
FIG. 10 to FIG. 14 are schematic diagrams of a structure of a receiver device according to an embodiment of this application.

FIG. 10 is a schematic diagram of a structure of a receiver device according to an embodiment of this application. As shown in FIG. 10, the receiver device 900 may include an antenna element 901, a signal source 902, and a demodulation module 903. The antenna element 901 may be connected to the signal source 902 and the demodulation module 903. The antenna element 901 may be configured to perform receiving and transmitting operations at different time points. In other words, the antenna element 901 may be used for uplink and downlink multiplexing. For example, when the receiver device 900 has a charging requirement, the signal source 902 may be configured to generate a charging request signal. The antenna element 901 may be configured to transmit the charging request signal when the signal source 902 outputs the charging request signal. The antenna element 901 may be further configured to: after completing transmitting the charging request signal, receive signaling from the transmitter device, and output the signaling to the demodulation module 903. The demodulation module 903 may be configured to demodulate the signaling from the antenna element 901.

For example, the signaling may be used to indicate a transmission resource (referred to as a first resource for ease of differentiation or description) for an energy transmission signal (referred to as a first energy transmission signal for ease of differentiation and description) used to charge the receiver device 900. The demodulation module 903 may determine the first resource based on demodulation of first signaling. Then the antenna element 901 may be configured to receive the first energy transmission signal on the first resource.

The first signaling received by the receiver device 900 from the transmitter device may be carried in the first energy transmission signal, or may not be carried in the first energy transmission signal and separately transmitted. Alternatively, the first signaling may be carried in an energy transmission signal (referred to as a second energy transmission signal for ease of differentiation and description) for transmission, where the energy transmission signal is used to charge another receiver device. This is not limited in this application. This depends on implementation behavior of the transmitter device.

If the transmitter device uses the first energy transmission signal to carry the first signaling, the receiver device 900 may demodulate the first signaling by using the demodulation module 903, to determine the first resource for transmitting the first energy transmission signal. Then the receiver device 900 may receive the first energy transmission signal on the first resource via the antenna element 901.

If the transmitter device uses the second energy transmission signal to carry the first signaling, the receiver device 900 may demodulate the first signaling by using the demodulation module 903, to determine the first resource for transmitting the first energy transmission signal. The receiver device 900 may receive no second energy transmission signal, but receive the first energy transmission signal on the first resource via the antenna element 901. The first energy transmission signal may be generated and transmitted following the second energy transmission signal.

If the transmitter device directly transmits the first signaling, the receiver device 900 may demodulate the first signaling by using the demodulation module 903, to determine the first resource for transmitting the first energy transmission signal, and receive the first energy transmission signal on the first resource. The first energy transmission signal may be generated and transmitted following the first signaling.

The first energy transmission signal may be received by using an energy receiving module 904. The energy receiving module 904 may be connected to the antenna element 901, and is configured to receive the first energy transmission signal received from the antenna element 901. In an implementation, the energy receiving module 904 may include a rectifier 9041 and a transformer 9042. The first energy transmission signal received by the antenna element 901 may sequentially pass through the rectifier 9041 and the transformer 9042. The rectifier 9041 may be configured to convert a received alternating current signal into a direct current signal. The transformer 9042 may be configured to adjust and output a stable voltage, to supply power to a load. As shown in the figure, the voltage output by the transformer 9042 may be used to charge a battery 905. For ease of description, the rectifier 9041 and the transformer 9042 are collectively referred to as the energy receiving module 904 below. A specific process in which the energy receiving module 904 receives an energy transmission signal to charge the battery 905 is not repeated.

Based on the foregoing design, the receiver device may use a same antenna element to receive and transmit a signal. The receiver device may control the antenna element based on different requirements, so that the antenna element switches between receiving and transmitting. Therefore, a receive link and a transmit link of the receiver device may share the antenna element, so that a quantity of antenna elements of the receiver device is reduced, greatly reducing hardware complexity of the receiver device, and cutting hardware costs.

To better understand the receiver device provided in this embodiment of this application, the following provides descriptions in more detail with reference to more accompanying drawings.

Figure 11:
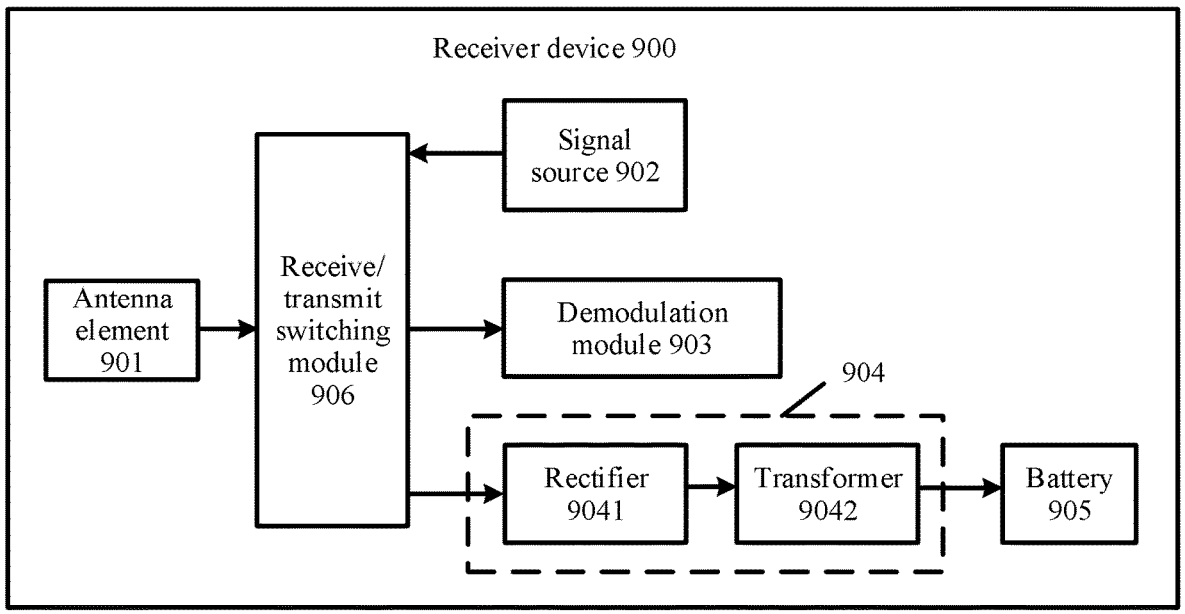

FIG. 11 is another schematic block diagram of a receiver device 900 according to an embodiment of this application. As shown in FIG. 11, the receiver device 900 further includes a receive/transmit switching module 906. The receive/transmit switching module 906 may be configured to switch the antenna element 901 to a transmitting state when a signal needs to be transmitted, and switch the antenna element 901 to a receiving state when no signal needs to be transmitted.

For example, the receive/transmit switching module 906 may be configured to switch the antenna element 901 to the transmitting state when the signal source 902 of the receiver device generates a charging request signal, in other words, when the charging request signal needs to be transmitted. The receive/transmit switching module 906 may be further configured to switch the antenna element 901 to the receiving state after transmission of the charging request signal is completed, or after the charging request signal is transmitted, so that the antenna element 901 can receive first signaling and a first energy transmission signal from a transmitter device at any time.

To properly configure received power and reduce unnecessary power consumption, the receiver device may adjust, based on whether a currently received signal is used to charge or to obtain signaling, power allocated to the demodulation module 903 and the energy receiving module 904.

Figure 12:
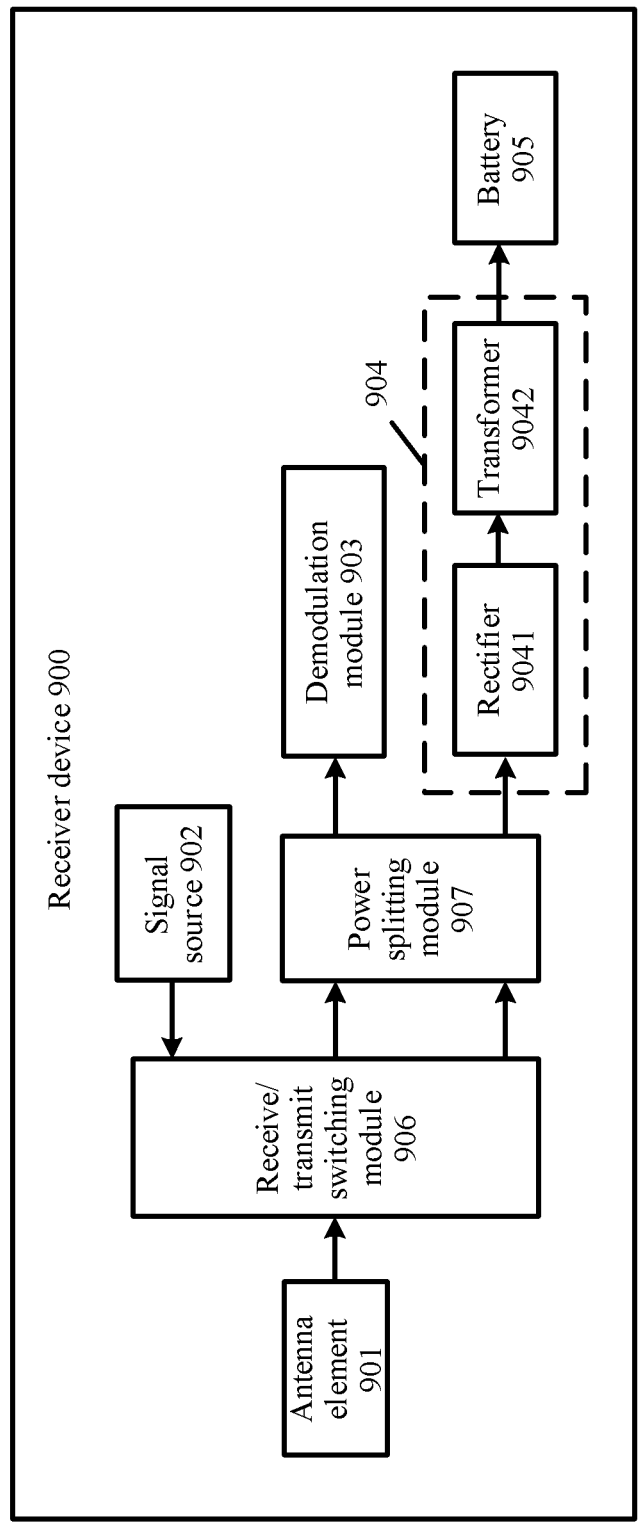

FIG. 12 is another schematic diagram of a structure of a receiver device 900 according to an embodiment of this application. As shown in FIG. 12, the receiver device 900 further includes a power splitting module 907. As shown in the figure, the power splitting module 907 may be disposed among the antenna element 901, the demodulation module 903, and the energy receiving module 904. The power splitting module 907 may divide received power into two parts based on a preconfigured power ratio. For example, when signaling is being received, larger power may be allocated to the demodulation module 903, and no power or smaller power may be allocated to the energy receiving module 904. When an energy transmission signal is being received, larger power may be allocated to the energy receiving module 904, and no power or smaller power may be allocated to the demodulation module 903.

As described above, a transmitter device may indicate a first resource to the receiver device by using first signaling. In this embodiment, the power splitting module 907 may be configured to: after the receiver device transmits a charging request signal, increase power allocated to the demodulation module 903, that is, increase received power of the first signaling. Because the first resource may include a time domain resource, the power splitting module 907 may be configured to increase received power at a time domain resource location indicated by the first signaling, that is, control to increase received power of the energy receiving module 904 on a time domain resource indicated by the first signaling. The power splitting module 907 may further allocate no received power to the energy receiving module 904 at a location other than the time domain resource indicated by the first signaling. This can save power. If the receiver device 900 has a charging requirement, in other words, has insufficient power, this can save power consumption, to ensure that a user can still normally use the receiver device 900 if the power is insufficient.

If a same transmitter device receives charging request signals from a plurality of receiver devices, a correspondence between each charging request signal and a receiver device needs to be distinguished, to determine how to adjust an amplitude and a phase of an energy transmission signal transmitted by each receiver device. In an implementation, the charging request signal transmitted by each receiver device may carry signaling, to indicate a device identifier of the receiver device, so that the transmitter device matches a charging request signal with each receiver device.

In this embodiment of this application, similar to the transmitter device, the signaling may also be carried in the charging request signal. For ease of differentiation and description, the signaling transmitted by the receiver device is denoted as a charging request. The charging request may carry the device identifier of the receiver device. The charging request signal may be a narrowband modulation signal.

In addition, the receiver device 900 may further include a signaling modulation module 908. The signaling modulation module 908 may be connected between the antenna element 901 and the signal source 902. The signaling modulation module 908 may be configured to generate a charging request signal that carries signaling. In this embodiment of this application, for ease of differentiation and description, the signaling generated by the receiver device 900 is denoted as a charging request.

To better understand embodiments of this application, the following provides descriptions in more detail with reference to more accompanying drawings.

Figure 13:
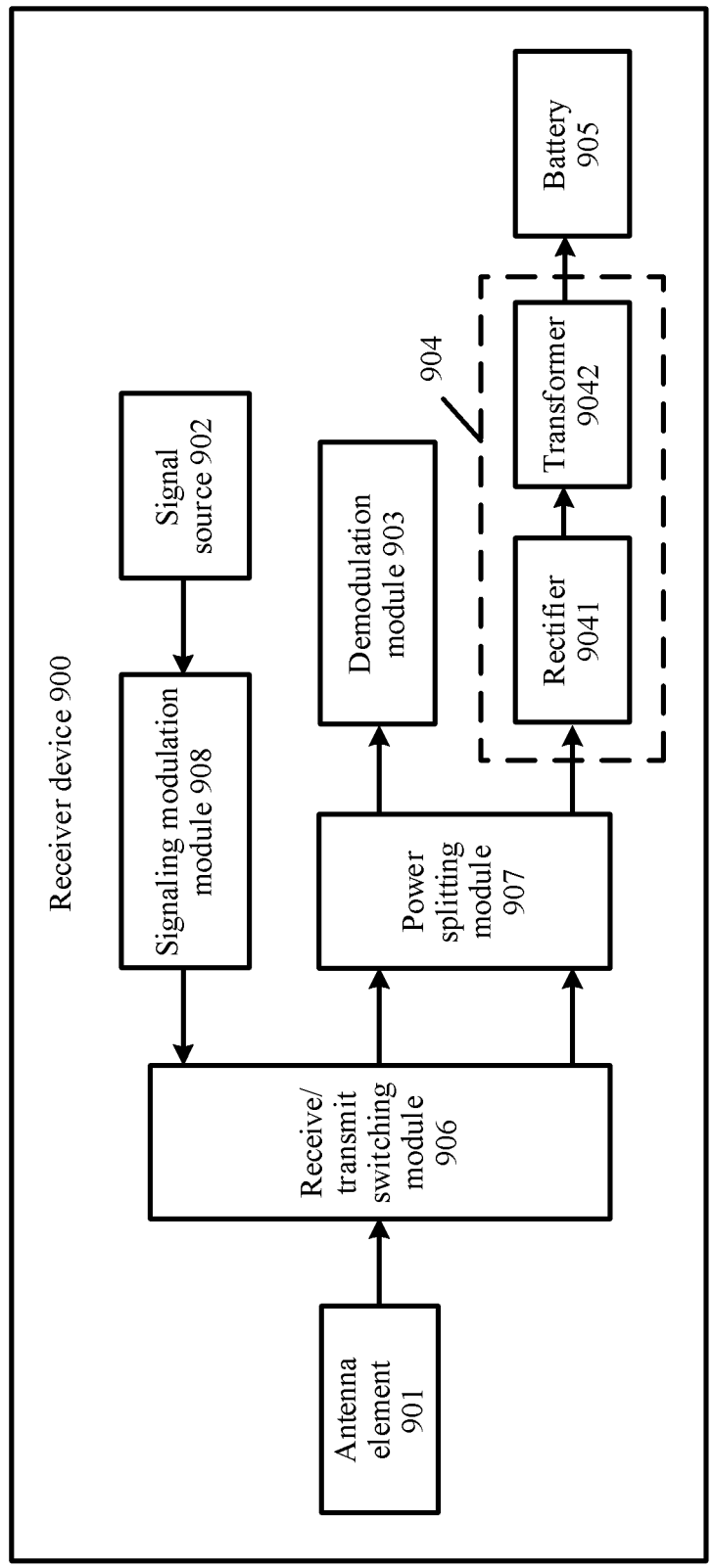

FIG. 13 is another schematic diagram of a structure of a receiver device according to an embodiment of this application. As shown in FIG. 13, the receiver device 900 may further include the signaling modulation module 908. The signaling modulation module 908 may be connected between the receive/transmit switching module 906 and the signal source 902. The signal source 902 may be configured to generate an unmodulated charging request signal (for example, a single-frequency signal). The signaling modulation module 908 may be configured to generate a narrowband modulation signal that carries signaling, output the narrowband modulation signal to the antenna element 901, and transmit the narrowband modulation signal via the antenna element 901. The narrowband modulation signal that carries the signaling is a charging request signal that carries a charging request.

Optionally, the charging request further includes a device identifier of the receiver device 900, to request to charge the receiver device 900. The device identifier of the receiver device 900 may be, for example, a hardware serial number carried by the device before delivery, that is, a preconfigured hardware serial number. The device identifier of the receiver device 900 may alternatively be a device identifier manually configured by a user. This is not limited in this application, provided that the device identifier can be used to uniquely identify the receiver device 900.

Optionally, the charging request further includes an indication for a requested resource, to request the transmitter device to transmit an energy transmission signal on the resource requested by the receiver device 900. For example, the receiver device 900 may request a transmission resource for a first energy transmission signal. The first resource may be, for example, some or all of the resources requested by the receiver device 900, and certainly, may not be the resource requested by the receiver device 900. This depends on scheduling of the transmitter device. This is not limited in this application.

Optionally, the charging request further includes an indication for a charging requirement, to indicate whether the receiver device 900 has the charging requirement. For example, the charging request may include an identifier bit. When a value of the identifier bit is "1", it may be considered that the receiver device has the charging requirement.

Optionally, the charging request further includes one or more of the following: a residual capacity of the receiver device 900, electricity consumption efficiency of the receiver device 900, and a device type of the receiver device 900.

The residual capacity and the electricity consumption efficiency may be used to determine standby time of the battery 905. Therefore, when the charging request includes the residual capacity and the electricity consumption efficiency of the receiver device 900, a transmitter device that receives the charging request may calculate the standby time of the battery 905 of the receiver device 900, to determine whether there is a charging requirement.

The device type can be used by the transmitter device to prioritize a plurality of receiver devices. If there are a plurality of receiver devices, the receiver devices may be prioritized for charging based on the device type.

Optionally, the charging request may be obtained by encoding an orthogonal code. In a possible implementation, the receiver device may encode the charging request by using an orthogonal code that is not allocated to another receiver device for use, to request the transmitter device to use the orthogonal code. If the transmitter device determines to allocate the orthogonal code to the receiver device for use, the transmitter device may, for example, broadcast a correspondence between the orthogonal code and a device identifier of the receiver device in signaling to be transmitted next time.

In this way, the plurality of receiver devices may transmit the charging request signal to the transmitter device on a same time-frequency resource. Because each receiver device uses a different orthogonal code, the transmitter device may decode, based on the different orthogonal codes, charging requests from different receiver devices, to obtain information in the charging requests, for example, identifier information of the receiver device.

In this way, the transmitter device may simultaneously receive charging request signals from a plurality of receiver devices and distinguish charging request signals at a same frequency, and does not need to distinguish different receiver devices by using different time domain resources and different frequency domain resources. This improves resource utilization to some extent, avoids a signaling interaction process between the plurality of receiver devices and the transmitter device, and reduces signaling overheads. In addition, this allows for simultaneous charging of the plurality of receiver devices, improving utilization efficiency of the energy transmission signal.

Figure 14:
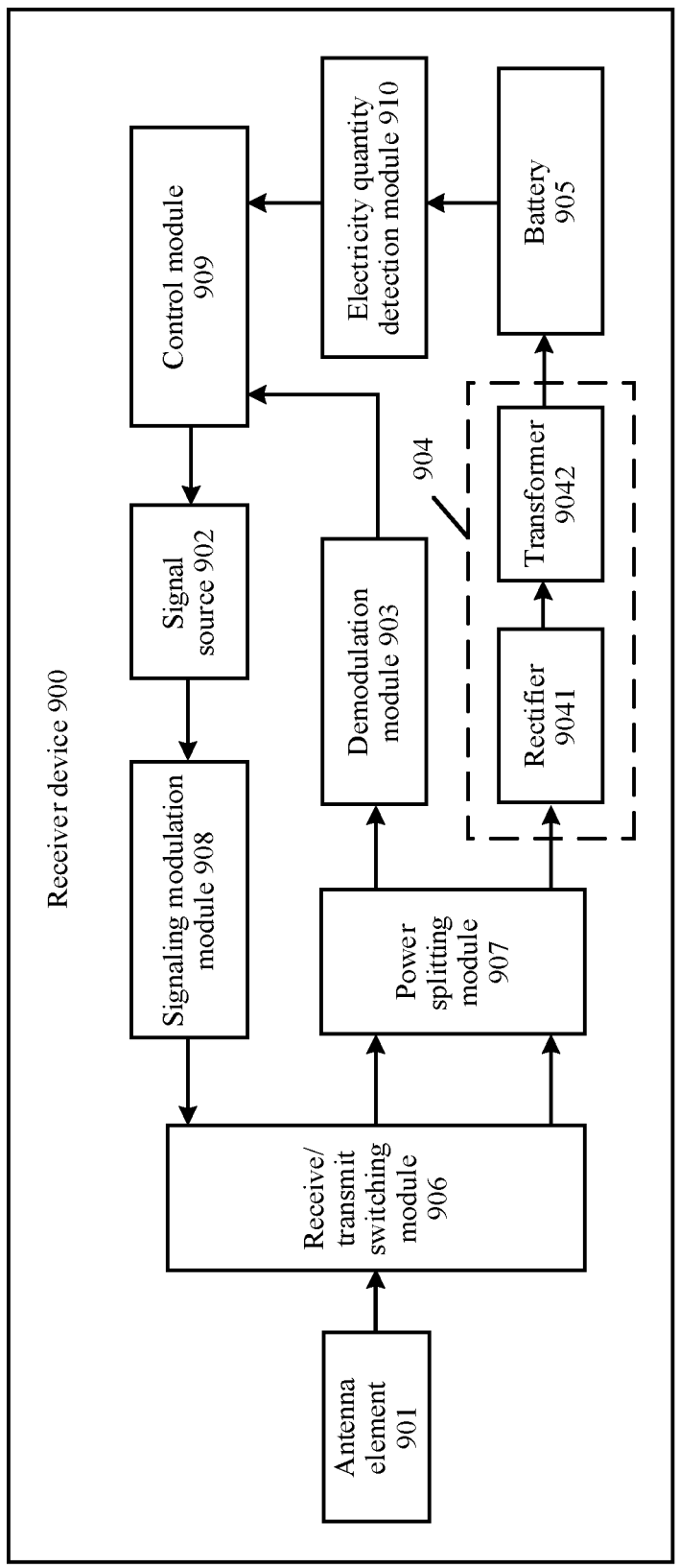

FIG. 14 is another schematic diagram of a structure of a receiver device 900 according to an embodiment of this application. As shown in FIG. 14, the receiver device 900 may further include a control module 909. The control module 909 may be configured to control a signaling modulation module 908 to generate a narrowband modulation signal that carries signaling.

For example, if determining that charging is required, the control module 909 may control the signaling modulation module 908 to generate a charging request signal that carries a charging request. The control module 909 may further select, based on signaling from the demodulation module 903, for example, signaling that is transmitted by the transmitter device before first signaling and that is used to indicate an idle resource and an idle orthogonal code, one of the idle orthogonal codes to encode the charging request. Therefore, the charging request signal may be distinguished from a charging request signal of another receiver device by using the orthogonal code.

To determine whether the receiver device 900 needs to be charged, the receiver device 900 may further include an electricity quantity detection module 910. The electricity quantity detection module 910 may be connected between the battery 905 and the control module 909. In a possible implementation, the electricity quantity detection module 910 may periodically detect a residual capacity and an electricity consumption rate of the battery. The electricity consumption rate may be evaluated, for example, based on average power consumption generated by a current service (for example, music playing, web page browsing, or a game). The electric quantity detection module 910 may further determine standby time of the battery 905 based on the residual capacity and the electricity consumption rate of the battery 905. If the determined standby time is shorter than or equal to a preset threshold (for example, denoted as a first threshold), it is considered that the battery 905 needs to be charged, in other words, the receiver device has a charging requirement. The electric quantity detection module 910 may trigger the control module 909 to control the signal source 902 to generate a charging request signal, further generate a charging request signal carrying a charging request by using the signaling modulation module 908, and transmit the charging request signal via the antenna element 901. For example, the electric quantity detection module 910 may transmit a signal to the control module 909, to notify the control module 909 that there is an energy receiving requirement.

It should be understood that the foregoing shows only one possible implementation for ease of understanding. A specific implementation in which the receiver device determines whether there is a charging requirement and notifies the transmitter device that there is the charging requirement is not limited in this application.

Further, the control module 909 may further send a charging termination request to the transmitter device, to request to terminate charging. In a possible implementation, if the battery of the receiver device is fully charged, the electric quantity detection module 910 may further trigger the control module 909 to control a signal source 902 to generate a charging request signal, further generate a charging termination request signal carrying a charging termination request by using the signaling modulation module 908, and transmit the charging termination request signal via the antenna element 901. For example, if the electric quantity detection module 910 detects, through periodic detection, that an electric quantity of battery is 100%, or is greater than or equal to a preset threshold (for example, denoted as a second threshold), the electric quantity detection module 910 may transmit a signal to the control module 909, to notify the control module 909 that there is a charging termination requirement. For example, the charging termination request may include an identifier bit. When a value of the identifier bit is "0", it may be considered that the receiver device has the charging termination requirement.

It should be understood that, for ease of understanding only, the foregoing shows several possible implementations of determining whether charging is required or whether charging termination is required. For specific implementations in which the receiver device determines whether there is a charging requirement, and whether there is a charging termination requirement, and the receiver device notifies the transmitter device that there is the charging requirement or there is the charging termination requirement in this application. This is not limited in this application. It should be further understood that, for ease of understanding only, the foregoing describes, by using descriptions of different functions of the electric quantity detection module 910 and the control module 909, a process in which the receiver device transmits a narrowband modulation signal that carries signaling to the transmitter device, to request to charge the receiver device. However, this shall not constitute any limitation on this application. Specific functions of the electric quantity detection module 910 and the control module 909 are not limited in this application. For example, the battery standby time may be determined by the electric quantity detection module 910, or the control module 909.

For another example, the electric quantity detection module 910 and the control module 909 may be integrated together.

In addition, the control module 909 may further determine one or more idle resources based on demodulation performed by the demodulation module 903 on pre-received signaling, and may determine a requested resource from the idle resources. When controlling the signaling modulation module 908 to generate the charging request, the control module 909 may indicate the requested resource to the signaling modulation module 908, so that an indication for the requested resource is carried in the charging request.

Optionally, the control module 909 may further determine one or more idle orthogonal codes based on demodulation performed by the demodulation module 903 on pre-received signaling, and may determine a requested orthogonal code from the idle orthogonal codes. When controlling the signaling modulation module 908 to generate the charging request, the control module 909 may indicate the requested orthogonal code to the signaling modulation module 908, so that the signaling modulation module 908 encodes the charging request based on the requested orthogonal code. Based on the foregoing solution, the receiver device may carry the signaling (for example, the charging request) in the narrowband modulation signal for transmission. In this case, when receiving the narrowband modulation signal, the transmitter device may detect an amplitude and a phase, and obtain a device identifier of a receiver device corresponding to the amplitude and the phase, to determine a correspondence between the receiver device and the amplitude and the phase. If the transmitter device simultaneously charges a plurality of receiver devices, amplitude and phase adjustment on different energy transmission signals to different receiver devices may be determined by using the correspondence. In addition, by using the orthogonal code, the transmitter device may distinguish different receiver devices in more dimensions, helping improve resource utilization.

It should be further understood that the control module 909 in FIG. 14 and the receive/transmit switching module 906 in FIG. 11 to FIG. 14 are defined based on different functions. Essentially, the control module 909 and the receive/transmit switching module 906 each have a control function. Therefore, the control module 909 and the receive/transmit switching module 906 may be a plurality of discrete modules, or may be integrated together. Although not shown in the figure, this is not limited in this application.

To better understand embodiments of this application, the following describes in more detail a specific process of the wireless charging method provided in this application with reference to accompanying drawings. It may be understood that, in the method embodiments described below, a transmitter device may be, for example, the transmitter device shown in any one of FIG. 5 to FIG. 9, and a receiver device may be, for example, the receiver device shown in any one of FIG. 10 to FIG. 14.

Figure 15:
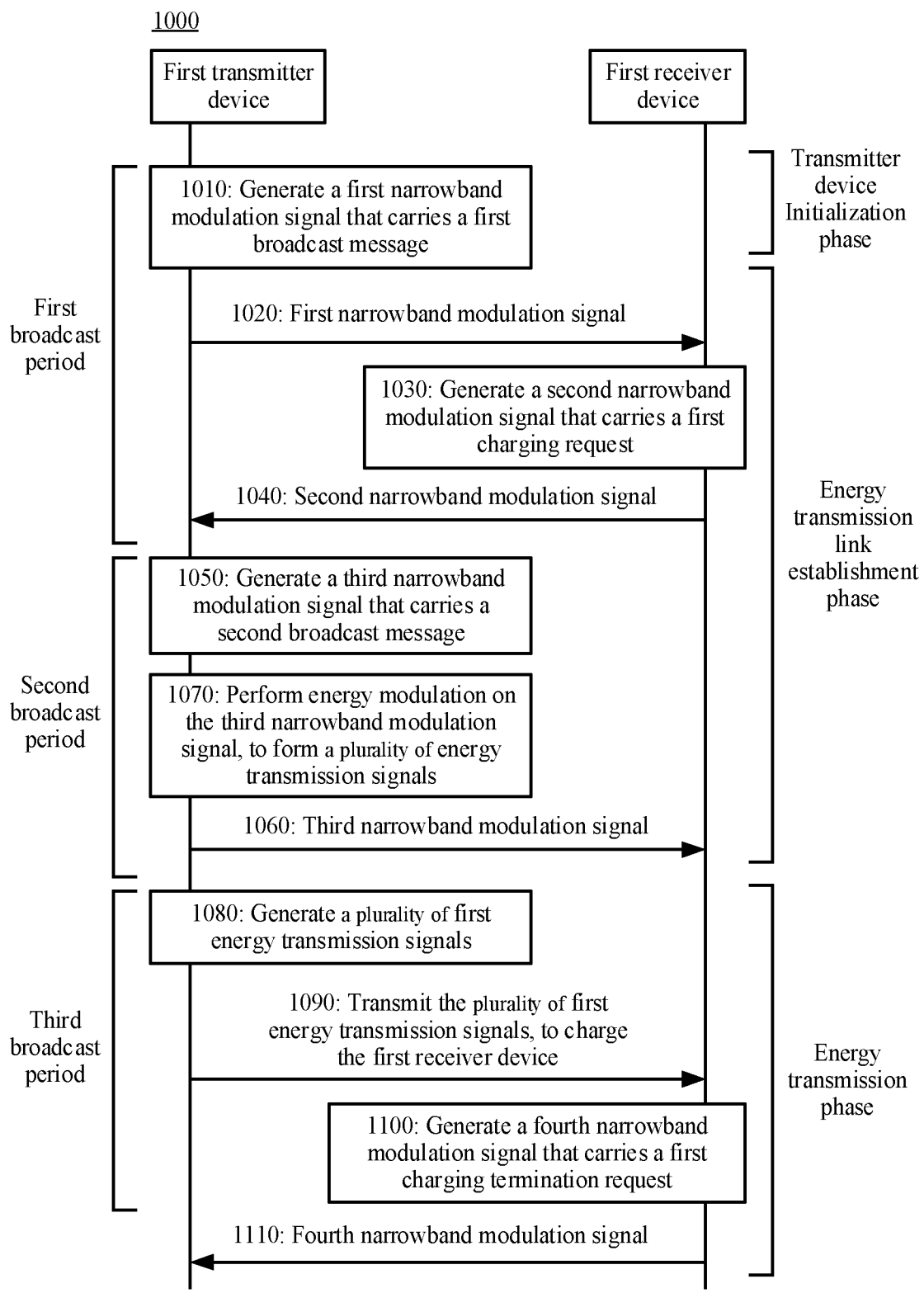
FIG. 15 and FIG. 16 are schematic diagrams of a specific wireless charging process according to an embodiment of this application.

FIG. 15 is a schematic flowchart of a wireless charging method according to an embodiment of this application. As shown in FIG. 15, the method 1000 may include step 1010 to step 1110. The following describes in detail the steps of the method.

For ease of understanding, the following uses a transmitter device in an initialization phase as an example to describe in detail a process from initialization of the transmitter device to providing a charging service.

For ease of differentiation and description, a transmitter device in the following embodiment is denoted as a first transmitter device. In this embodiment, the first transmitter device may periodically send a broadcast message. The broadcast message sent each time may include an indication for an idle resource and an indication for a correspondence between an in-use resource and a receiver device, and may further include an indication for an idle orthogonal code and an indication for the correspondence between an in-use orthogonal code and a receiver device. The transmitter device may send the broadcast message based on a preset time length. The preset time length is a time length of the period. Certainly, the first transmitter device may alternatively send the broadcast message aperiodically, for example, send the broadcast message based on a received charging request signal. This is not limited in this application.

In step 1010, the first transmitter device generates a first narrowband modulation signal that carries a first broadcast message.

It should be understood that the first broadcast message may be understood as an example of signaling transmitted by the transmitter device. For ease of distinguishing from a narrowband modulation signal described below, the narrowband modulation signal that carries the first broadcast message is denoted as a first narrowband modulation signal herein.

The first transmitter device may be, for example, a new transmitter device. The first transmitter device may first complete information initialization. Therefore, the first broadcast message may be a first broadcast message sent by the first transmitter device in the initialization phase. Because the first transmitter device may periodically send a broadcast message, in other words, the first broadcast message may be a broadcast message sent by the first transmitter device in a first broadcast period.

The first broadcast message may include an indication for an idle resource. For example, the first transmitter device may predetermine an available idle resource. As described above, the idle resource may be an unscheduled resource. The first transmitter device may send a current idle resource by using the first broadcast message. In this case, if the receiver device has a charging requirement, the receiver device requests, based on the idle resource, a transmission resource for an energy transmission signal used to charge the receiver device.

Optionally, the first broadcast message further includes an idle orthogonal code.

As described above, the idle orthogonal code may be an orthogonal code that is not allocated to the receiver device for use. Because the receiver device may be charged by using different transmitter devices or a same transmitter device, to distinguish different receiver devices, each orthogonal code corresponds to one receiver device. Therefore, if there are a plurality of transmitter devices, the plurality of transmitter devices pre-store a same idle orthogonal code in the initialization phase. Once a receiver device uses one orthogonal code, none of the plurality of transmitter devices can allocate the orthogonal code to another receiver device for use. In other words, the idle orthogonal code is an idle orthogonal code shared by the plurality of transmitter devices.

Herein, the plurality of transmitter devices may be understood as a plurality of transmitter devices that can be detected by a same receiver device, or a plurality of transmitter devices that are communicatively connected to each other. This is not limited in this application.

Optionally, the first broadcast message further includes a device identifier of the first transmitter device.

To help the receiver device distinguish different transmitter devices when there are a plurality of transmitter devices, each transmitter device may notify its device identifier to the receiver device. In this embodiment, the first transmitter device may send a device identifier of the first transmitter device by using the first broadcast message. The device identifier may be, for example, a hardware serial number of the first transmitter device before delivery, or a device identifier manually configured. This is not limited in this application, provided that the device identifier can be used to uniquely identify the first transmitter device.

The first transmitter device and one or more other transmitter devices may transmit signaling on a same resource. Therefore, to help the receiver device distinguish different transmitter devices, and further distinguish information in signaling transmitted by each transmitter device, each transmitter device may further encode the signaling by using an orthogonal code of each transmitter device before transmitting the signaling. The receiver device may obtain an orthogonal code of the first transmitter device in a process of registering with the first transmitter device. Then the receiver device may decode, based on the orthogonal code, the signaling from the first transmitter device.

Optionally, the first broadcast message further includes a receiver device to be served.

For example, the first transmitter device may determine, based on a verification status of the receiver device, the receiver device to be served. There may be one or more receiver devices to be served by the first transmitter device. This is not limited in this application. In addition, the receiver device to be served by the first transmitter device is not fixed. Because the receiver device may be a terminal device with high mobility, the receiver device to be served in real time by the first transmitter device may be different because of a change in a geographical location of the receiver device. In other words, a receiver device to be served that is broadcast in the first broadcast message may be understood as a receiver device to be served currently, or a receiver device to be served in a time period from a current broadcast period to a next broadcast period.

In this embodiment of this application, step 1010 may be implemented, for example, by a signaling modulation module in the transmitter device. The signaling modulation module may modulate the first broadcast message to a narrowband signal, to form the first narrowband modulation signal.

In step 1020, the first transmitter device transmits the first narrowband modulation signal.

As described above, the first transmitter device is still in an initialization phase and does not provide a charging service currently. Therefore, the first transmitter device does not need to perform amplitude and phase adjustment on the first narrowband modulation signal. The first transmitter device may directly transmit the first narrowband modulation signal.

Correspondingly, in step 1020, a first receiver device receives the first narrowband modulation signal.

When a receiver device (for ease of differentiation and description, for example, denoted as the first receiver device) determines that there is a charging requirement, the receiver device may monitor a broadcast message from each transmitter device, to determine an idle resource. For example, the first receiver device may monitor the first broadcast message from the first transmitter device.

It should be understood that the first receiver device may be any one of a plurality of receiver devices that have charging requirements. In other words, when there is a charging requirement, each receiver device may determine the idle resource by monitoring to the broadcast message.

In this embodiment of this application, for the first transmitter device, step 1020 may be implemented, for example, via an antenna element in the transmitter device. For example, after the signaling modulation module generates and outputs the first narrowband modulation signal, the power division network may replicate the first narrowband modulation signal into a plurality of first narrowband modulation signals. However, the plurality of first narrowband modulation signals may be directly transmitted by using a plurality of antenna elements without amplitude and phase adjustment.

For the first receiver device, step 1020 may be implemented, for example, by an antenna element and a demodulation module in the receiver device. For example, after receiving the first narrowband modulation signal, the antenna element may obtain the first broadcast message in the first narrowband modulation signal through demodulation by the demodulation module.

It should be further understood that a specific implementation in which the receiver device determines whether there is a charging requirement is described in detail above. For brevity, details are not described herein again.

In step 1030, the first receiver device generates a second narrowband modulation signal that carries a first charging request.

It should be understood that the first charging request may be understood as an example of signaling transmitted by the receiver device. For ease of differentiation and description, a charging request generated by the first receiver device is denoted as the first charging request, and a narrowband modulation signal that carries the first charging request is denoted as the second narrowband modulation signal. The first charging request may be corresponding to the charging request. The second narrowband modulation signal may be corresponding to the charging request signal.

The first charging request may include a resource requested by the first receiver device. The resource requested by the first receiver device may be, for example, selected from one or more idle resources determined from a recently received broadcast message (for example, the first broadcast message).

To distinguish different receiver devices, each receiver device may notify its device identifier to the transmitter device. Optionally, the first charging request further includes a device identifier of the first receiver device. The device identifier may be, for example, a hardware serial number of the first receiver device before delivery, or a device identifier manually configured by a user. This is not limited in this application, provided that the device identifier can be used to uniquely identify the first receiver device.

Optionally, the first charging request further includes an energy receiving state identifier bit. The energy receiving state identifier bit is used to indicate a current requirement of the first receiver device, for example, a charging requirement or a charging termination requirement. The foregoing has described the identifier bit by using an example. For brevity, details are not described herein again.

Optionally, the first charging request further includes a security key.

The security key may be used by the first transmitter device to perform security authentication on the first receiver device. If the security authentication on the first receiver device succeeds, the first transmitter device may provide a charging service for the first receiver device. If the security authentication on the first receiver device fails, the first transmitter device may refuse to provide a charging service for the first receiver device. This can prevent an unauthorized device from occupying an energy transmission resource.

The security key may be, for example, a manually specified password of a transmitter device, and is similar to a login password of a wireless router in a Wi-Fi technology.

Optionally, the first charging request further includes one or more of the following: a residual capacity of the first receiver device, electricity consumption efficiency of the first receiver device, and a device type of the first receiver device.

The residual capacity and the electricity consumption efficiency may be used to determine standby time of a battery. Therefore, when the first charging request includes the residual capacity and the electricity consumption efficiency of the first receiver device, a transmitter device that receives the first charging request (for example, the first transmitter device) may calculate standby time of a battery of the first receiver device, to determine whether there is a charging requirement.

The device type can be used by the transmitter device to prioritize a plurality of receiver devices. If there are a plurality of receiver devices, the receiver devices may be prioritized for charging based on the device type.

Optionally, the second narrowband modulation signal is obtained by encoding a first orthogonal code.

As described above, the first broadcast message further includes an idle orthogonal code. The first receiver device may select one of the idle orthogonal codes indicated in the first broadcast message, for example, the first orthogonal code, and request the first orthogonal code from the first transmitter device through encoding a signal based on the first orthogonal code. The signal encoded based on the first orthogonal code and a signal of another receiver device that is transmitted on a same resource may not interfere with each other. Therefore, the transmitter device may receive signals from different receiver devices based on different orthogonal codes.

It should be noted that the first receiver device may send the first charging request to one transmitter device (for example, the first transmitter device), or to a plurality of transmitter devices. If the first receiver device sends the first charging request to the plurality of transmitter devices, the first receiver device may further include synchronization information in the first charging request sent to the transmitter devices. The synchronization information is used for synchronization between the plurality of transmitter devices.

Specifically, the plurality of transmitter devices may not be synchronized with each other, and a transmitter device and a receiver device may not be synchronized with each other. Therefore, to ensure that high charging efficiency can be achieved when the plurality of transmitter devices charge a same receiver device, a time offset between each of the transmitter devices and the receiver device may be detected by using the receiver device as a reference.

For example, the first receiver device may indicate, in a first charging request sent to each of the transmitter devices, a time offset between the first receiver device and the transmitter device. For example, the first receiver device may indicate, in a first charging request sent to the first transmitter device, a time offset between the first receiver device and the first transmitter device. In this case, synchronization information in the first charging request sent by the first receiver device to each of the transmitter devices may be different.

Alternatively, the first receiver device may indicate, in a first charging request sent to a plurality of transmitter devices, a time offset between the first receiver device and each of the transmitter devices. For example, the first receiver device may indicate, in a first charging request sent to the first transmitter device, a time offset between the first receiver device and each of the transmitter devices. In this case, synchronization information in the first charging request sent by the first receiver device to each of the transmitter devices may be the same.

In this embodiment of this application, step 1030 may be implemented, for example, by a signaling modulation module in the receiver device. The signaling modulation module may modulate the first charging request to a narrowband signal, to form the second narrowband modulation signal.

In step 1040, the first receiver device transmits the second narrowband modulation signal.

The first receiver device may transmit the second narrowband modulation signal to the first transmitter device. On one hand, the second narrowband modulation signal may be used by the first transmitter device to detect a phase and an amplitude. On the other hand, the second narrowband modulation signal may carry the first charging request.

Correspondingly, in step 1040, the first transmitter device receives the second narrowband modulation signal.

In this embodiment of this application, for the first receiver device, step 1040 may be implemented, for example, via the antenna element in the receiver device. For the first transmitter device, step 1040 may be implemented, for example, by the antenna element and a demodulation module in the transmitter device. For example, after receiving the second narrowband modulation signal, the antenna element may obtain the first charging request in the second narrowband modulation signal through demodulation by the demodulation module. In step 1050, the first transmitter device generates a third narrowband modulation signal that carries a second broadcast message.

A time point when the first transmitter device generates the third narrowband modulation signal that carries the second broadcast message may be used as a start point of a second broadcast period, or in other words, an end point of the first broadcast period.

After receiving the first charging request from the first receiver device, the first transmitter device may determine a resource for the first receiver device. For ease of differentiation and description, the resource determined for the first receiver device is denoted as a first resource. The first resource may be, for example, some or all of the resources requested by the first receiver device in the first charging request, or may not be the resource requested by the first receiver device. This is not limited in this application.

The first transmitter device may indicate, in the second broadcast message, a correspondence between the first resource and the first receiver device, so that the first receiver device determines a specific resource on which the energy transmission signal is to be received.

It should be noted that the first resource is not necessarily allocated only to the first receiver device. In other words, an energy transmission signal transmitted by using the first resource is not used only for charging the first receiver device. When energy focusing of a same energy transmission signal may be obtained at a plurality of receiver devices, the first transmitter device may also allocate the first resource to one or more receiver devices including the first receiver device for use.

Actually, the second broadcast message does not include only an indication for the correspondence between the first resource and the first receiver device. The first transmitter device may simultaneously allocate a plurality of resources to a plurality of receiver devices. Therefore, the second broadcast message may include an indication for a correspondence between a plurality of in-use resources and the plurality of receiver devices.

In addition, the first transmitter device generates the second broadcast message based on the first charging request. This does not mean that the first transmitter device generates the second broadcast message only if the first transmitter device receives the first charging request. For example, even if the first transmitter device does not receive a charging request from any receiver device, the first transmitter device may periodically transmit a broadcast message based on a preset period. For another example, after receiving the first charging request, the first transmitter device may not immediately allocate the first resource to the first receiver device to transmit the energy transmission signal, but allocate the first resource to the first receiver device in a broadcast period after the second broadcast period. This is not limited in this application. For ease of understanding, in this embodiment, it is assumed that the first transmitter device allocates the first resource to the first receiver device in a next broadcast period (that is, the second broadcast period) after receiving the first charging request.

In this embodiment of this application, step 1050 may be implemented, for example, by the signaling modulation module in the transmitter device. A specific implementation process of step 1050 is the same as the specific implementation process of step 1100. For brevity, details are not described herein again.

In step 1060, the first transmitter device transmits the third narrowband modulation signal.

Correspondingly, in step 1060, the first receiver device receives the third narrowband modulation signal.

In this embodiment of this application, for the first transmitter device, step 1060 may be implemented, for example, via the antenna element in the transmitter device. For the first receiver device, step 1060 may be implemented, for example, by the antenna element and the demodulation module in the receiver device. A specific implementation process of step 1060 is similar to the specific implementation process of step 1020. For brevity, details are not described herein again.

The first transmitter device may simultaneously transmit the third narrowband modulation signal and the energy transmission signal to the first receiver device, or may transmit the energy transmission signal to the first receiver device in a next broadcast period (for example, the third broadcast period) or any broadcast period after the second broadcast period. Specific transmission time may be determined based on the first resource. This is not limited in this application. For ease of understanding, this embodiment shows a process in which the first transmitter device transmits the energy transmission signal to the first receiver device in the third broadcast period.

It should be noted that, if the first transmitter device does not need to transmit an energy transmission signal in this case, the first transmitter device may perform no energy modulation on the third narrowband modulation signal, and directly transmit the third narrowband modulation signal via the antenna element. If the first transmitter device needs to transmit the energy transmission signal in this case, the first transmitter device may further perform energy modulation on the third narrowband modulation signal before transmitting the third narrowband modulation signal.

Optionally, before step 1060, the method 1000 further includes step 1070: The first transmitter device performs energy modulation on the third narrowband modulation signal. Specifically, the first transmitter device replicates the third narrowband modulation signal into a plurality of narrowband modulation signals. Phase adjustment may be performed on each third narrowband modulation signal by using a phase shifter, and amplitude adjustment may be performed on each third narrowband modulation signal by using an amplifier, to form an energy transmission signal. A plurality of energy transmission signals may be transmitted via a plurality of antenna elements. It should be understood that the signal is described as the energy transmission signal from a perspective of whether the energy modulation is performed. Actually, narrowband modulation is performed on each energy transmission signal before energy modulation. Therefore, each energy transmission signal may also be referred to as a narrowband modulation signal.

It should be understood that the process shown in FIG. 15 shows only an example of charging another receiver device. As described above, the plurality of energy transmission signals generated in step 1070 may be understood as energy transmission signals for charging other receiver devices, or energy transmission signals for charging one or more receiver devices including the first receiver device. This is not limited in this application.

In this embodiment of this application, step 1070 may be implemented, for example, by an energy modulation module in the transmitter device.

In this way, the first receiver device completes establishment of an energy transmission link between the first receiver device and the first transmitter device. In other words, the foregoing step 1020 to step 1070 may be referred to as an energy transmission link establishment phase.

In step 1080, the first transmitter device generates a plurality of first energy transmission signals.

For ease of differentiation and description, an energy transmission signal for charging the first receiver device is denoted as a first energy transmission signal.

A time point when the first transmitter device generates the plurality of first energy transmission signals may be used as a start point of the third broadcast period, or in other words, an end point of the second broadcast period.

The first transmitter device may generate a plurality of first energy transmission signals that carry third broadcast messages. For example, a single-frequency carrier signal generated by a signal source is processed by the signaling modulation module to obtain a narrowband modulation signal that carries the third broadcast message. The narrowband modulation signal that carries the third broadcast message is output to the energy modulation module for energy modulation, to form a plurality of first energy transmission signals. Because an energy modulation process has been described in detail above. For brevity, details are not described herein again.

The third broadcast message may include an indication for an idle resource and an indication for the correspondence between an in-use resource and a receiver device. The in-use resource may include the first resource. A receiver device corresponding to the first resource may be one or more receiver devices including the first receiver device.

The third broadcast message may further include an indication for an idle orthogonal code and an indication for a correspondence between an in-use orthogonal code and a receiver device. The in-use orthogonal code may include a first orthogonal code. A receiver device corresponding to the first orthogonal code may be the first receiver device.

It may be understood that the idle resource and the idle orthogonal code that are indicated by the third broadcast message may be an idle resource and an idle orthogonal code in the third broadcast period. The in-use resource and the in-use orthogonal code that are indicated by the third broadcast message may be a resource and an orthogonal code that are scheduled for use in the third broadcast period.

It should be understood that the plurality of first energy transmission signals may also be referred to as narrowband modulation signals. Herein, to merely emphasize that the narrowband modulation signal may be used to charge the first receiver device, the narrowband modulation signal is named the first energy transmission signal. This shall not constitute any limitation on this application.

It should be further understood that the first transmitter device may alternatively not generate signaling, for example, the third broadcast message, in a process of generating the first energy transmission signal. For example, in a case in which the first transmitter device aperiodically sends a broadcast message, if there is no broadcasting requirement in this case, the first transmitter device may directly generate a plurality of first energy transmission signals. For example, the signal source generates a single-frequency carrier signal. Narrowband modulation does not need to be performed on the single-frequency carrier signal, or narrowband modulation is performed on the single-frequency carrier signal but no signaling is carried. Assuming that narrowband modulation is not performed on the single-frequency carrier signal, a signal output by the signaling modulation module is still the single-frequency carrier signal, and the single-frequency carrier signal is output to the energy modulation module. The energy modulation module replicates the single-frequency carrier signal into a plurality of single-frequency carrier signals that have a same frequency, a same amplitude, and a same phase. Phase adjustment may be performed on each single-frequency carrier signal by using a phase shifter, and amplitude adjustment may be performed on each single-frequency carrier signal by using an amplifier, to form a first energy transmission signal. In this case, the first energy transmission signal may be a single-frequency carrier signal. Certainly, narrowband modulation may also be performed on a single-frequency carrier signal generated by the signal source, to form a narrowband signal. This is not limited in this application.

In this embodiment of this application, if the plurality of first energy transmission signals carry no signaling, step 1080 may be implemented, for example, by the signal source and the energy modulation module in the transmitter device. If the plurality of first energy transmission signals carry signaling (for example, the third broadcast message), step 1080 may be implemented, for example, by the signal source, the signaling modulation module, and the energy modulation module in the transmitter device.

In step 1090, the first transmitter device transmits the plurality of first energy transmission signals, to charge the first receiver device.

The plurality of first energy transmission signals obtained through energy modulation may be transmitted on the first resource described above.

Correspondingly, in step 1090, the first receiver device receives the plurality of energy transmission signals, and is charged.

The first receiver device may determine the first resource based on the received second broadcast message, and then receive the plurality of energy transmission signals on the first resource. The energy focusing of the plurality of energy transmission signals from the first transmitter device is obtained right at the first receiver device, to charge the first charging device. In this way, the first receiver device enters a charging state.

In this embodiment of this application, for the first transmitter device, step 1090 may be implemented, for example, via the antenna element in the transmitter device. For the first receiver device, step 1090 may be implemented, for example, by the antenna element and an energy receiving module in the receiver device.

As described above, the plurality of first energy transmission signals may not be used only for charging the first receiver device. The energy focusing of the plurality of first energy transmission signals may be obtained at a plurality of receiver devices that include the first receiver device, and therefore may be for simultaneously charging the plurality of receiver devices that include the first receiver device.

It may be understood that, when the first receiver device is being charged, the first transmitter device may further allocate a resource to another receiver device, to subsequently transmit an energy transmission signal. For example, after receiving a second charging request from a second receiver device, the first transmitter device may carry a fourth broadcast message by using the first energy transmission signal, to indicate a correspondence between a second resource and the second receiver device, and subsequently transmit, by using the second resource, a plurality of second energy transmission signals used to charge the second receiver device. For a specific process, refer to the foregoing related descriptions with reference to step 1040 to step 1090. For brevity, details are not described herein again. It may be understood that, a time point when the first transmitter device carries the fourth broadcast message in the first energy transmission signal may be used as a start point of a next broadcast period (for example, denoted as a fourth broadcast period) of the third broadcast period, or an end point of the third broadcast period. Although the fourth broadcast period is not shown in the figure, this shall not constitute any limitation on this application.

If determining that charging is no longer required, the first receiver device may stop receiving the energy transmission signal, for example, stop receiving the plurality of first energy transmission signals. In an implementation, the first receiver device may reduce received power of the energy receiving module by using the power splitting module, to stop receiving the energy transmission signal.

Optionally, the method 1000 further includes step 1100: The first receiver device generates a fourth narrowband modulation signal that carries a charging termination request.

The first receiver device may further generate the fourth narrowband modulation signal that carries the charging termination request. A specific process in which the first receiver device generates the narrowband modulation signal that carries the charging termination request is similar to the specific process in which the first receiver device generates the narrowband modulation signal that carries the charging request. However, it may be understood that an energy receiving state of the first receiver device indicated in the charging termination request is different from the energy receiving state of the first receiver device indicated in the first charging request.

It should be understood that a specific implementation process of step 1100 is similar to the specific implementation process of step 1030. For brevity, details are not described herein again.

In step 1110, the first receiver device transmits the fourth narrowband modulation signal. Correspondingly, the first transmitter device and the second transmitter device receive the fourth narrowband modulation signal.

It should be understood that a specific implementation process of step 1110 is similar to the specific implementation process of step 1040. For brevity, details are not described herein again.

It should be further understood that step 1110 may be performed in the third broadcast period, or in a broadcast period after the third broadcast period. This is not limited in this application. Step 1110 shown in the figure may be understood as being performed in a broadcast period after the third broadcast period. Actually, a broadcast period is for the transmitter device to send a broadcast message, and is irrelevant to behavior of the receiver device.

A process of step 1080 to step 1110 may be defined as an energy transmission phase. Then the first receiver device stops charging.

In another aspect, if the plurality of first energy transmission signals transmitted by the first transmitter device are used to charge only the first receiver device, the first transmitter device may stop generating and transmitting the plurality of first energy transmission signals after receiving the charging termination request. In addition, the first energy transmission signal may release the first resource, and the first resource may be indicated as the idle resource in a next broadcast message. The first transmitter device may further cancel a correspondence between the first receiver device and the first orthogonal code, and the first orthogonal code may be indicated as in the next broadcast message.

If the plurality of first energy transmission signals transmitted by the first transmitter device are not used only for charging the first receiver device, the first transmitter device may temporarily cancel only the correspondence between the first receiver device and the first orthogonal code, and the first orthogonal code may be indicated as the idle orthogonal code in the next broadcast message. After receiving charging termination requests of all receiver devices charged by using the first energy transmission signal, the first transmitter device may stop generating and transmitting the plurality of first energy transmission signals. In addition, the first energy transmission signal may release the first resource, and the first resource may be indicated as the idle resource in a broadcast message to be sent next time.

Based on the foregoing technical solutions, the transmitter device may transmit signaling, an energy transmission signal, and an energy transmission signal that carries the signaling through a same link, and the receiver device may also receive the signaling and the energy transmission signal through a same link. This can greatly reduce hardware complexity of the device and cuts costs. In addition, the receiver device may also carry signaling in a signal, so that the transmitter device can distinguish signals from different receiver devices. Even if there are a plurality of transmitter devices and/or a plurality of receiver devices, signaling transmitted by each device may be carried in a signal transmitted by the device, to implicitly indicate a correspondence between the signal and the signaling. This can also avoid excessively high signaling overheads to some extent. In addition, the receiver device and the transmitter device may further separately encode the signal by using the orthogonal code, so that each receiver device is transparent to another receiver device, and each transmitter device is also transparent to another transmitter device. In this way, receiver devices and transmitter devices do not affect each other. Therefore, powerful technical support is provided for one-to-many, many-to-one, and many-to-many charging scenarios between the transmitter device and the receiver device.

It should be understood that, for ease of understanding only, the foregoing describes the wireless charging method provided in this embodiment of this application by using interaction between the first transmitter device and the first receiver device as an example. The steps and correspondences between modules of the transmitter device and modules of the receiver device are also correspondingly described. However, these are merely examples for ease of understanding. Based on a same concept, a person skilled in the art may perform variations or equivalent replacements based on structures of the transmitter device and the receiver device, to implement a same or similar function. A transmitter device and a receiver device obtained based on the variations or equivalent replacements can still be used to implement the steps in the foregoing method embodiments. Therefore, these variations and equivalent replacements shall fall within the protection scope of this application.

Figure 16:
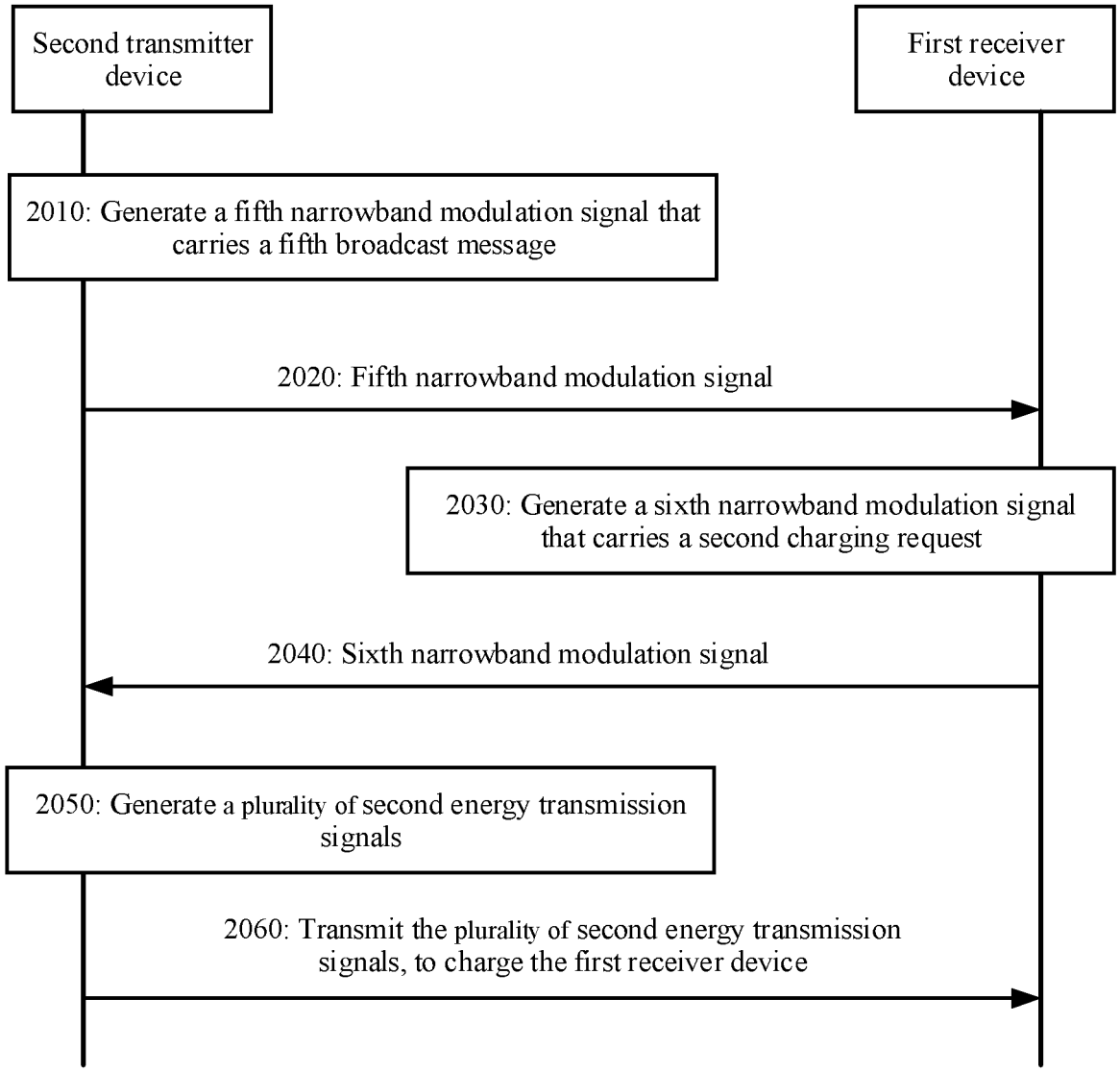

On the other hand, in a charging process of the first receiver device, a new transmitter device may also be added. The new transmitter device is denoted as, for example, a second transmitter device. With reference to FIG. 16, the following describes in detail the method provided in an embodiment of this application for the new second transmitter device.

As shown in FIG. 16, the method 2000 may include step 2010 to step 2060. The following describes in detail the steps of the method 2000.

For ease of understanding, it is assumed that the second transmitter device may also periodically send a broadcast message. The broadcast message sent each time may include an indication for an idle resource and an indication for a correspondence between an in-use resource and the receiver device, and may further include an indication for an idle orthogonal code and an indication for the correspondence between an in-use orthogonal code and the receiver device. Certainly, the second transmitter device may alternatively send the broadcast message aperiodically, for example, send the broadcast message based on a received charging request signal. This is not limited in this application.

In step 2010, the second transmitter device generates a fifth narrowband modulation signal that carries a fifth broadcast message.

The fifth broadcast message is a broadcast message generated by the second transmitter device in a fifth broadcast period. This embodiment is defined merely for ease of distinguishing from the foregoing first broadcast message to the fourth broadcast message and the foregoing first broadcast period to the fourth broadcast period. The fifth broadcast message may be understood as a first broadcast message generated by the second transmitter device in an initialization process. The fifth broadcast period may also be understood as a first broadcast period of the second transmitter device.

The second transmitter device may be a new transmitter device that can be detected by the first receiver device. In this case, the second transmitter device may be in the initialization phase, in other words, provides no charging service currently. In this case, all resources that can be used by the second transmitter device are idle resources. The fifth broadcast message generated by the second transmitter device may include an indication for an idle resource.

The second transmitter device may also be a transmitter device that is newly detected due to a change in a geographical location of the first receiver device. In this case, the second transmitter device may not be in the initialization phase. The second transmitter device may be providing a charging service for another receiver device, or may provide no charging service temporarily. If the second transmitter device has provided the charging service for another receiver device, the fifth broadcast message may further include an indication for a correspondence between an in-use resource and the another receiver device. This is not limited in this application.

Optionally, the fourth broadcast message further includes a device identifier of the second transmitter device.

Optionally, the fourth broadcast message further includes an orthogonal code of the second transmitter device.

Optionally, the fourth broadcast message further includes a receiver device to be served.

A specific implementation process of step 2010 is similar to the specific implementation process of step 1010. For brevity, details are not described herein again.

In step 2020, the second transmitter device transmits the fifth narrowband modulation signal. Correspondingly, in step 2020, the first receiver device receives the fifth narrowband modulation signal.

A specific implementation process of step 2020 is similar to the specific implementation process of step 1020. For brevity, details are not described herein again.

The first receiver device may determine, based on the received fifth narrowband modulation signal, an idle resource that can be currently used by the second transmitter device. If the idle resource that can be currently used by the second transmitter device includes the first resource, the first receiver device may request the second transmitter device to charge the first receiver device. In this embodiment, it is assumed that the idle resource that can be currently used by the second transmitter device includes the first resource.

In step 2030, the first receiver device generates a sixth narrowband modulation signal that carries a second charging request.

Specifically, the second charging request includes an indication for the first resource. In other words, the first receiver device may notify the second transmitter device of the first resource currently used for transmitting the first energy transmission signal, so that the second transmitter device determines whether the energy transmission signal can be transmitted for the first receiver device on a same resource.

It may be understood that, if the idle resource that can be currently used by the second transmitter device does not include the first resource, the first receiver device does not send the charging request to the second transmitter device. Step 2030 and subsequent steps may not be performed.

Optionally, the second charging request may be obtained by encoding the first orthogonal code.

Optionally, the second charging request further includes a device identifier of the second receiver device.

Optionally, the second charging request further includes synchronization information.

The synchronization information in the second charging request may include, for example, a time offset between the second transmitter device and the first receiver device. The synchronization information may be used for synchronization between the second transmitter device and another transmitter device (for example, the first transmitter device).

Optionally, the second charging request further includes an energy receiving state identifier bit, and the energy receiving state identifier bit is used to indicate a current requirement of the first receiver device.

Optionally, the second charging request further includes one or more of the following: the residual capacity of the first receiver device, the electricity consumption efficiency of the first receiver device, and the device type of the first receiver device.

Optionally, the second charging request further includes the device identifier of the first transmitter device.

Optionally, the second charging request further includes a security key.

It should be understood that the information carried in the second charging request is described in detail above. For brevity, details are not described herein again.

In step 2040, the first receiver device transmits the sixth narrowband modulation signal. Correspondingly, in step 2040, the second transmitter device receives the sixth narrowband modulation signal.

A specific implementation process of step 2040 may be similar to the specific implementation process of step 1040. For brevity, details are not described herein again.

The second transmitter device determines, based on the second charging request, whether the energy transmission signal can be transmitted on the first resource, to charge the first receiver device. If the energy transmission signal can be transmitted on the first resource, the second transmitter device may perform step 2050: Generate a plurality of second energy transmission signals; and perform step 2060: Transmit the plurality of second energy transmission signals on the first resource, to charge the first receiver device. Correspondingly, the first receiver device may perform step 2060: Receive the second energy transmission signal on the first resource, to be charged. If the energy transmission signal cannot be transmitted on the first resource, the second transmitter device may not make a response, or may indicate the first resource as the idle resource in a broadcast message to be sent next time, or may indicate the first resource as the in-use resource. However, a correspondence between the first resource and another receiver device is not limited in this application.

Because step 2050 to step 2060 are similar to step 1080 and step 1090 described above. For brevity, details are not described herein again.

Based on the foregoing technical solution, the first receiver device can request, if a new transmitter device exists, more transmitter devices to charge the first receiver device. In this case, a plurality of transmitter devices can obtain optimal power configuration if total transmit power is limited, to help improve charging efficiency. In addition, the new transmitter device (for example, the second transmitter device) and an original transmitter device may be transparent to each other. Therefore, an operation on the original transmitter device (for example, the first transmitter device) is not affected.

It should be understood that the foregoing uses only the first transmitter device and the second transmitter device as an example to describe in detail a process in which a plurality of transmitter devices charge a same receiver device. However, this shall not constitute any limitation on this application. A quantity of transmitter device is not limited in this application. In addition, the first transmitter device may charge more other receiver devices while charging the first receiver device, and the second transmitter device may also charge more other receiver devices while charging the first receiver device. Receiver devices served by the first transmitter device and receiver devices served by the second transmitter device may be the same or partially different. This is not limited in this application.

This application further provides a chip. The chip may be, for example, a chip disposed in a transmitter device or a receiver device. The chip may be configured to implement a control function. For example, the chip may be the control module 450 in the transmitter device 400 or the control module 909 in the receiver device 900 shown above with reference to the accompanying drawings, or may be configured to implement a function of the control module 450 in the transmitter device 400 or a function of the control module 909 in the receiver device 900.

An embodiment of this application further provides a wireless charging system. The wireless charging system includes one or more foregoing transmitter devices and one or more foregoing receiver devices.

An embodiment of this application further provides a computer-readable storage medium. The computer-readable storage medium stores computer instructions. When the computer instructions run on a transmitter device or a receiver device, the transmitter device is enabled to perform the steps performed by the transmitter device in the foregoing method embodiments, or the receiver device is enabled to perform the steps performed by the receiver device in the foregoing method embodiments, to implement the wireless charging method in the foregoing embodiments.

An embodiment of this application further provides a computer program product. When the computer program product runs on a computer, the computer is enabled to perform the foregoing related steps, to implement the wireless charging method performed by the transmitter device or the receiver device in the foregoing embodiments.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

A person skilled in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in an electrical form, a mechanical form, or other forms.

The units described as separate parts may or may not be physically separate. Parts displayed as units may or may not be physical units, and may be located in one position or may be distributed on a plurality of network units. Some or all of the units may be selected based on actual requirements to achieve the objectives of the solutions in embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes: any medium that can store program code, such as a universal serial bus (USB) flash drive, a removable hard disk, a read-only memory (ROM), a random-access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless charging method implemented by a transmitter device, the wireless charging method comprising:
scheduling, based on one or more charging request signals from one or more receiver devices, a first resource for transmitting an energy transmission signal, wherein the first resource is a time domain resource, a frequency domain resource, or both the time domain resource and the frequency domain resource;
allocating one or more orthogonal codes to the one or more receiver devices to distinguish between the one or more receiver devices;
generating a narrowband modulation signal comprising signaling, wherein the signaling comprises a first cor-

49 respondence between the first resource and the one or more receiver devices and comprises a second correspondence between the one or more orthogonal codes and the one or more receiver devices;

performing amplitude adjustment and phase adjustment on the narrowband modulation signal based on the one or more charging request signals to form the energy transmission signal; and transmitting the energy transmission signal on the first resource to charge the one or more receiver devices.

2. The wireless charging method of claim 1, further comprising:

receiving the one or more charging request signals from the one or more receiver devices; and determining, using the one or more charging request signals, an amplitude of the energy transmission signal and a phase of the energy transmission signal.

3. The wireless charging method of claim 2, wherein the one or more receiver devices comprise a first receiver device, wherein the one or more charging request signals comprise a first charging request signal that is from the first receiver device and that comprises a charging request, and wherein the charging request comprises an identifier of the first receiver device and a first indication for a requested resource for transmission of the energy transmission signal.

4. The wireless charging method of claim 3, wherein the one or more orthogonal codes comprise a first orthogonal code that is allocated to the first receiver device, and wherein the charging request is encoded based on the first orthogonal code.

5. The wireless charging method of claim 3, wherein the charging request further comprises:

a second indication for a charging requirement to indicate whether the first receiver device has the charging requirement; and synchronization information for synchronization between a plurality of transmitter devices comprising the transmitter device, wherein the one or more charging request signals are narrowband modulation signals, and wherein the signaling is a broadcast message and further comprises:

a third indication for an idle resource that is an unscheduled resource; and a device identifier of the transmitter device.

6. The wireless charging method of claim 1, wherein the signaling is a broadcast message.

7. The wireless charging method of claim 1, further comprising further performing the amplitude adjustment using a power amplifier and the phase adjustment using a phase shifter.

8. A wireless charging method implemented by a first receiver device, the wireless charging method comprising:

generating a first charging request signal;

transmitting, when the first receiver device has a charging requirement, the first charging request signal comprising a first charging request and requesting to charge the first receiver device, wherein the first charging request comprises an identifier of the first receiver device and a first indication for a requested resource so as to request transmission of an energy transmission signal on the requested resource;

receiving, from a first transmitter device, first signaling comprising a first correspondence between a first resource scheduled for transmitting the energy transmission signal and one or more receiver devices comprising the first receiver device, wherein the first

50 resource comprises a time domain resource, a frequency domain resource, or both the time domain resource and the frequency domain resource, and wherein the energy transmission signal is for charging the first receiver device; and receiving, on the first resource and from the first transmitter device, the energy transmission signal.

9. The wireless charging method of claim 8, wherein the first signaling further comprises a second correspondence between the one or more receiver devices and one or more orthogonal codes, and wherein each orthogonal code of the one or more orthogonal codes is allocated to a corresponding receiver device of the one or more receiver devices to distinguish different receiver devices of the one or more receiver devices.

10. The wireless charging method of claim 8, further comprising:

requesting, from the first transmitter device, an orthogonal code; and encoding the first charging request using the orthogonal code, wherein the first charging request further comprises a second indication for the charging requirement to indicate whether the first receiver device has the charging requirement, and wherein the first charging request signal and the energy transmission signal are narrowband modulation signals.

11. The wireless charging method of claim 8, further comprising:

receiving, from a second transmitter device, second signaling comprising a second indication for an idle resource, wherein the idle resource comprises the first resource;

generating a second charging request signal comprising a second charging request, wherein the second charging request comprises a third indication for the first resource; and transmitting the second charging request signal.

12. The wireless charging method of claim 11, wherein the second charging request further comprises synchronization information for synchronization between a plurality of transmitter devices, and wherein the plurality of transmitter devices comprises the first transmitter device and the second transmitter device.

13. The wireless charging method of claim 8, further comprising charging the first receiver device using the energy transmission signal.

14. A transmitter device comprising:

a memory configured to store computer instructions; and a processor coupled to the memory and configured to invoke the computer instructions to cause the transmitter device to:

schedule, based on one or more charging request signals from one or more receiver devices, a first resource for transmitting an energy transmission signal, wherein the first resource is a time domain resource, a frequency domain resource, or both the time domain resource and the frequency domain resource;

allocate one or more orthogonal codes to the one or more receiver devices to distinguish between the one or more receiver devices;

generate a narrowband modulation signal comprising signaling, wherein the signaling comprises a first correspondence between the first resource and the one or more receiver devices and comprises a second correspondence between the one or more orthogonal codes and the one or more receiver devices;

perform amplitude adjustment and phase adjustment on the narrowband modulation signal based on the one or more charging request signals to form the energy transmission signal; and transmit the energy transmission signal on the first resource to charge the one or more receiver devices.

15. The transmitter device of claim 14, wherein the processor is further configured to invoke the computer instructions to cause the transmitter device to:

receive the one or more charging request signals from the one or more receiver devices; and determine, using the one or more charging request signals, an amplitude of the energy transmission signal and a phase of the energy transmission signal.

16. The transmitter device of claim 15, wherein the one or more receiver devices comprise a first receiver device, wherein the one or more charging request signals comprise a first charging request signal that is from the first receiver device and that comprises a charging request, and wherein the charging request comprises an identifier of the first receiver device and a first indication for a requested resource for transmission of the energy transmission signal.

17. The transmitter device of claim 16, wherein the one or more orthogonal codes comprise a first orthogonal code that is allocated to the first receiver device, and wherein the charging request is encoded based on the first orthogonal code.

18. The transmitter device of claim 16, wherein the charging request further comprises:

a second indication for a charging requirement to indicate whether the first receiver device has the charging requirement; and synchronization information for synchronization between a plurality of transmitter devices comprising the transmitter device, wherein the one or more charging request signals are narrowband modulation signals, and wherein the signaling is a broadcast message and further comprises:

a third indication for an idle resource that is an unscheduled resource; and a device identifier of the transmitter device.

19. The transmitter device of claim 14, wherein the signaling is a broadcast message.

20. The transmitter device of claim 14, further comprising a power amplifier and a phase shifter, wherein the processor is further configured to invoke the computer instructions to cause the transmitter device to further perform the amplitude adjustment using the power amplifier and the phase adjustment using the phase shifter.

* * * * *